US012197936B2

(12) United States Patent
Birsan et al.

(10) Patent No.: US 12,197,936 B2
(45) Date of Patent: Jan. 14, 2025

(54) SCALABLE VISUALIZATION OF A CONTAINERIZED APPLICATION IN A MULTIPLE-CLUSTER AND MULTIPLE DEPLOYMENT APPLICATION ENVIRONMENT

(71) Applicant: Red Hat, Inc., Raleigh, NC (US)

(72) Inventors: Valentina Birsan, Toronto (CA); Joshua Packer, Toronto (CA); Master T. Piyasirisilp, Toronto (CA); Feng Xiang, Toronto (CA)

(73) Assignee: Red Hat, Inc., Raleigh, NC (US)

( * ) Notice: Subject to any disclaimer, the term of this patent is extended or adjusted under 35 U.S.C. 154(b) by 595 days.

(21) Appl. No.: 17/502,534

(22) Filed: Oct. 15, 2021

(65) Prior Publication Data

US 2023/0126168 A1 Apr. 27, 2023

(51) Int. Cl.
*G06F 9/455* (2018.01)
*G06F 9/50* (2006.01)
*G06F 11/32* (2006.01)

(52) U.S. Cl.
CPC ........ *G06F 9/45558* (2013.01); *G06F 9/5077* (2013.01); *G06F 11/323* (2013.01); *G06F 11/324* (2013.01); *G06F 2009/4557* (2013.01); *G06F 2209/505* (2013.01); *G06F 2209/508* (2013.01)

(58) Field of Classification Search
CPC .. G06F 9/45558; G06F 9/5077; G06F 11/323; G06F 11/324; G06F 2009/4557; G06F 2209/505; G06F 2209/508
See application file for complete search history.

(56) References Cited

U.S. PATENT DOCUMENTS 8,479,098 B2 7/2013 Kimmet
8,516,477 B1 8/2013 Kearns et al.
(Continued)

FOREIGN PATENT DOCUMENTS

CN 107908521 A 4/2018
CN 110262944 A 9/2019
(Continued)

OTHER PUBLICATIONS

Advisory Action for U.S. Appl. No. 17/107,355, mailed May 3, 2023, 10 pages.
(Continued)

*Primary Examiner* — Jacob D Dascomb
(74) *Attorney, Agent, or Firm* — Dority & Manning, P.A.

(57) ABSTRACT

A set of deployment applications that are configured to deploy a plurality of resources that compose a containerized application onto at least one cluster of a plurality of different clusters is identified. Each cluster includes a plurality of nodes onto which the plurality of resources can be deployed. A set of clusters of the plurality of clusters onto which the plurality of resources have been deployed as a plurality of deployed resources is identified. User interface imagery that includes information that: identifies a set of deployed resources of the plurality of deployed resources of the containerized application; identifies a total number of deployment applications in the set of deployment applications; and identifies a total number of clusters in the set of clusters is generated. The user interface imagery is presented on a display device.

20 Claims, 11 Drawing Sheets

(56) References Cited

U.S. PATENT DOCUMENTS

| | | | |
|---|---|---|---|
| 9,043,786 | B1 | 5/2015 | Hodge et al. |
| 9,256,467 | B1 | 2/2016 | Singh et al. |
| 9,319,286 | B2 | 4/2016 | Panuganty |
| 9,645,805 | B2 | 5/2017 | Govindaraju et al. |
| 9,645,858 | B2 | 5/2017 | Winterfeldt et al. |
| 9,727,439 | B2 | 8/2017 | Mohammed et al. |
| 9,805,322 | B2 | 10/2017 | Kelkar et al. |
| 10,284,685 | B2 | 5/2019 | Bauer et al. |
| 10,505,815 | B2 | 12/2019 | Padala et al. |
| 10,547,521 | B1* | 1/2020 | Roy .................. H04L 41/0895 |
| 10,581,705 | B2 | 3/2020 | Patil et al. |
| 10,860,622 | B1 | 12/2020 | Florissi |
| 10,868,742 | B2 | 12/2020 | Chitalia et al. |
| 11,323,327 | B1 | 5/2022 | Chitalia et al. |
| 2015/0229532 | A1 | 8/2015 | Somaiya et al. |
| 2016/0182397 | A1 | 6/2016 | McFarlin et al. |
| 2016/0188421 | A1* | 6/2016 | Karinta ................. G06F 16/188 707/654 |
| 2016/0292578 | A1 | 10/2016 | Ashenfelter |
| 2017/0339008 | A1 | 11/2017 | Dion et al. |
| 2018/0287902 | A1 | 10/2018 | Chitalia et al. |
| 2018/0349199 | A1 | 12/2018 | Vyas et al. |
| 2019/0066368 | A1 | 2/2019 | Paul et al. |
| 2019/0182101 | A1 | 6/2019 | Kulshreshtha et al. |
| 2020/0014607 | A1 | 1/2020 | Gangadhar et al. |
| 2020/0218580 | A1 | 7/2020 | Kim |
| 2020/0344124 | A1 | 10/2020 | Christober |
| 2020/0348984 | A1* | 11/2020 | Giannetti ............. G06F 9/5072 |
| 2021/0200814 | A1 | 7/2021 | Tal et al. |

FOREIGN PATENT DOCUMENTS

| | | | |
|---|---|---|---|
| WO | 2014145777 | A1 | 9/2014 |
| WO | 2020017844 | A1 | 1/2020 |

OTHER PUBLICATIONS

Notice of Allowance and Notice of Allowability for U.S. Appl. No. 17/082,725, mailed Jul. 18, 2023, 26 pages.

U.S. Appl. No. 17/082,725, filed Oct. 28, 2020.

U.S. Appl. No. 17/107,355, filed Nov. 30, 2020.

Author Unknown, "Access Kubernetes Resources from the Azure Portal," Microsoft, Dec. 16, 2020, https://docs.microsoft.com/en-us/azure/aks/kubernetes-portal, 6 pages.

Author Unknown, "Application and Hybrid Application Resources," IBM Corporation, 2020, https://www.ibm.com/docs/en/cloud-paks/cp-management/2.2.x?topic=management-application-resources, 9 pages.

Author Unknown, "Viewing application composition using the Topology view," Red Hat, Feb. 2020, https://docs.openshift.com/container-platform/4.2/applications/application_life_cycle_management/odc-viewing-application-composition-using-topology-view.html, 9 pages.

Casperson, M., "Alternative Kubernetes Dashboards," Octopus Deploy, Sep. 22, 2020, https://octopus.com/blog/alternative-kubernetes-dashboards, 14 pages.

Haider, H., "The Ultimate Guide to the KubernetesDashboard: How to Install, Access, Authenticateand Add Heapster Metrics," replex, Apr. 19, 2019, https://www.replex.io/blog/how-to-install-access-and-add-heapster-metrics-to-the-kubernetes-dashboard, 15 pages.

Author Unknown, "How to use the Pega Autonomic Event Services Enterprise Health console," Pegasystems Inc., Sep. 25, 2019, https://community.pega.com/knowledgebase/articles/pega-autonomic-event-services/how-use-pega-autonomic-event-services-enterprise-health-console, 24 pages.

Author Unknown, "Web UI (Dashboard)," The Linux Foundation, May 12, 2021, https://kubernetes.io/docs/tasks/access-application-cluster/web-ui-dashboard/, 5 pages.

Calasanz, Rafael Tolosana, et al., "Towards the Scientific Cloud Workflow Architecture," 5th International Workshop on ADVANCEs in ICT Infrastructures and Services (ADVANCE 2017), Jan. 2017, Evry, France, 11 pages.

Maenhaut, Pieter-Jan, et al., "Resource Management in a Containerized Cloud: Status and Challenges," Journal of Network and Systems Management, Nov. 2019, 51 pages.

Muralidharan, Shapna, et al., "Monitoring and Managing IoT Applications in Smart Cities Using Kubernetes," Cloud Computing 2019 : The Tenth International Conference on Cloud Computing, GRIDs, and Virtualization, 2019, 7 pages.

Nguyen, Dinh Khoa, et al., "Blueprinting Approach in Support of Cloud Computing," Future Internet 2012, 4, 322-346; doi:10.3390/fi4010322, Mar. 21, 2012, 26 pages.

Non-Final Office Action for U.S. Appl. No. 17/107,355, mailed Sep. 14, 2022, 33 pages.

Final Office Action for U.S. Appl. No. 17/107,355, mailed Feb. 13, 2023, 30 pages.

Non-Final Office Action for U.S. Appl. No. 17/082,725, mailed Feb. 7, 2023, 22 pages.

* cited by examiner

SCALABLE VISUALIZATION OF A CONTAINERIZED APPLICATION IN A MULTIPLE-CLUSTER AND MULTIPLE DEPLOYMENT APPLICATION ENVIRONMENT

BACKGROUND

Container orchestration systems automate the deployment, scaling, and management of containerized applications among nodes in a cluster.

SUMMARY

The examples disclosed herein implement scalable visualization of a containerized application in a multiple-cluster and multiple-deployment application environment.

In one example a method is provided. The method includes identifying, by a computing device comprising a processor device, a set of deployment applications of a plurality of deployment applications, each deployment application in the set being configured to deploy a plurality of resources that compose a containerized application onto at least one cluster of a plurality of different clusters, each cluster comprising a plurality of nodes onto which the plurality of resources can be deployed. The method further includes identifying a set of clusters of the plurality of clusters onto which the plurality of resources have been deployed as a plurality of deployed resources. The method further includes generating user interface imagery that includes information that: identifies a set of deployed resources of the plurality of deployed resources of the containerized application; identifies a total number of deployment applications in the set of deployment applications; and identifies a total number of clusters in the set of clusters. The method further includes presenting, on a display device, the user interface imagery.

In another example a computing device is provided. The computing device includes a memory, and a processor device coupled to the memory. The processor device is to identify a set of deployment applications of a plurality of deployment applications, each deployment application in the set being configured to deploy a plurality of resources that compose a containerized application onto at least one cluster of a plurality of different clusters, each cluster comprising a plurality of nodes onto which the plurality of resources can be deployed. The processor device is further to identify a set of clusters of the plurality of clusters onto which the plurality of resources have been deployed as a plurality of deployed resources. The processor device is further to generate user interface imagery that includes information that: identifies a set of deployed resources of the plurality of deployed resources of the containerized application; identifies a total number of deployment applications in the set of deployment applications; and identifies a total number of clusters in the set of clusters. The processor device is further to present, on a display device, the user interface imagery.

In another example a non-transitory computer-readable storage medium is provided. The non-transitory computer-readable storage medium includes executable instructions to cause a processor device to identify a set of deployment applications of a plurality of deployment applications, each deployment application in the set being configured to deploy a plurality of resources that compose a containerized application onto at least one cluster of a plurality of different clusters, each cluster comprising a plurality of nodes onto which the plurality of resources can be deployed. The executable instructions further cause the processor device to identify a set of clusters of the plurality of clusters onto which the plurality of resources have been deployed as a plurality of deployed resources. The executable instructions further cause the processor device to generate user interface imagery that includes information that: identifies a set of deployed resources of the plurality of deployed resources of the containerized application; identifies a total number of deployment applications in the set of deployment applications; and identifies a total number of clusters in the set of clusters. The executable instructions further cause the processor device to present, on a display device, the user interface imagery.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
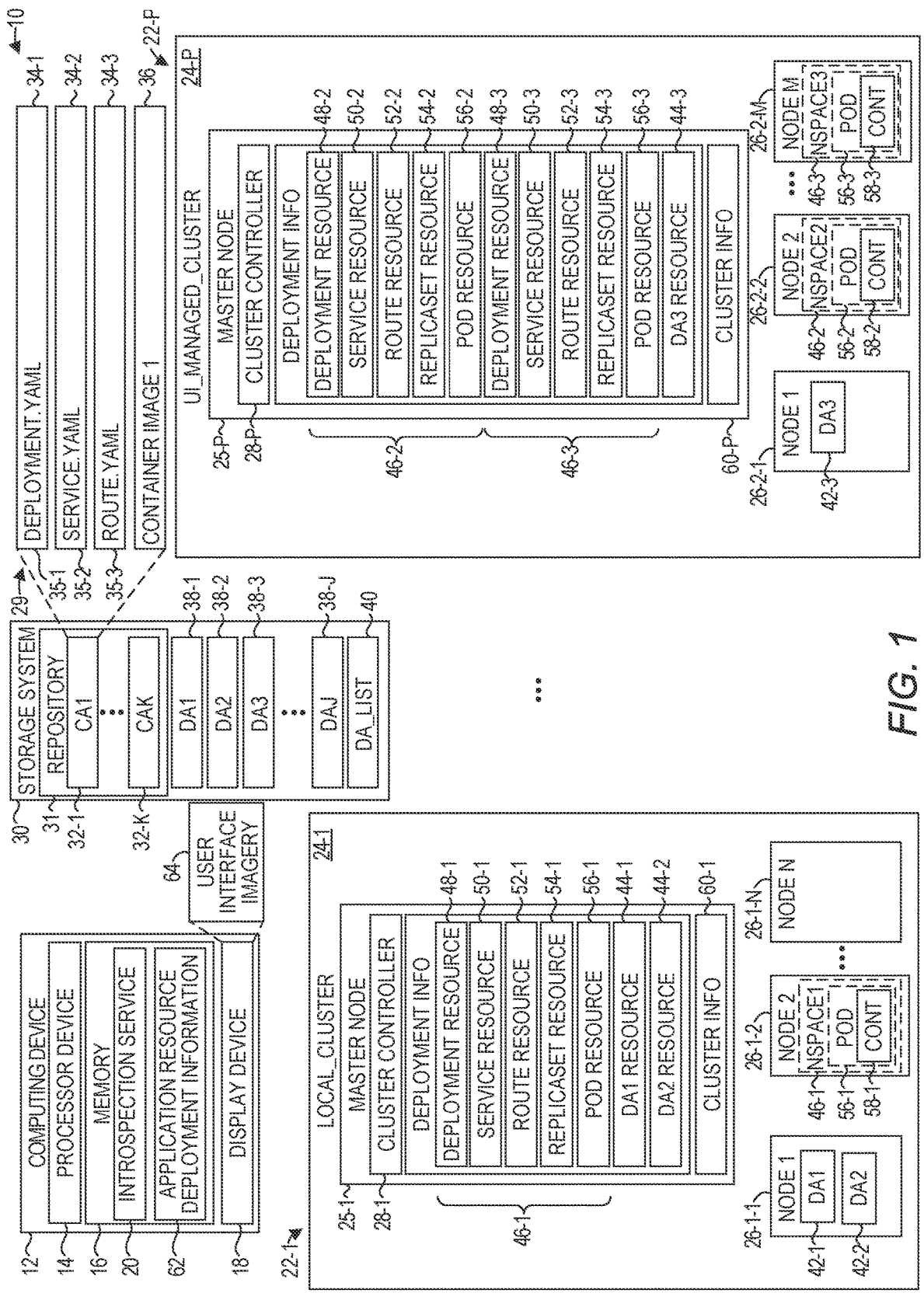
FIG. 1 is a block diagram of a runtime environment in which examples of scalable visualization of a containerized application in a multiple-cluster and multiple deployment application environment can be implemented.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Container orchestration systems automate the deployment, scaling, and management of containerized applications among nodes in a cluster. A containerized application may include tens or hundreds of different containers and other resources, and each container or resource may have any number of instances distributed over many different nodes in a cluster. Increasingly, especially in conjunction with cloud computing environments, a containerized application may be distributed over many different nodes in several different clusters.

As containerization technologies have matured and grown in popularity, it has become popular to utilize multiple deployment applications to deploy containerized applications from a single repository, such as a GitHub repository, or the like, onto multiple clusters. However, the use of multiple deployment applications to deploy containerized applications across multiple clusters makes it more difficult for a user, such as an operator, to determine where resources are deployed, which deployment application caused the resources to be deployed, and, if there is a deployment problem, whether the problem is caused by the deployment application, the cluster, or the resource.

To diagnose a problem, the operator may need to first identify which deployment applications are responsible for deploying a containerized application, and also may need to submit queries to multiple different cluster controllers in an attempt to locate the cause of the problem. This can be time-consuming and requires detailed knowledge of not only the resources that compose each containerized application, but knowledge of clusters on which such resources should be deployed, and knowledge of which deployment applications are deploying the resources. Consequently, it can take an operator a relatively long time to debug a deployment issue, and the services provided by the containerized application may be unavailable during this period of time, resulting in user dissatisfaction, an inability to process orders, or an inability to provide some other important business function.

The examples disclosed herein implement scalable visualization of a containerized application in a multiple-cluster multiple-deployment application environment. Deployment application Information is determined that identifies a set of deployment applications that are configured to deploy a plurality of resources of a containerized application onto one or more clusters of a plurality of clusters. Cluster information is determined that identifies the total number of clusters in the plurality of clusters. User interface imagery is generated that identifies a set of resources of a containerized application, the number of deployment applications that are configured to deploy the containerized application, and the number of clusters onto which the deployment applications are configured to deploy the containerized application. The user interface imagery is presented on a display device to identify deployed resources of the containerized application, the number of deployment applications configured to deploy the containerized application, and the number of clusters onto which the deployment applications are configured to deploy the containerized application.

In some embodiments, the user interface imagery includes status indicators that identify whether any problems exist with respect to a deployment application, a cluster, or a resource of the containerized application. A user, such as an operator, may select an icon that corresponds to the deployment applications, the clusters, or a resource. In response, status information may be presented that corresponds to the selected icon. Among other advantages, the examples disclosed herein present concise, scalable, and intuitive information to an operator regarding the deployment status of resources of a containerized application in a multiple-cluster multiple-deployment application environment.

FIG. 1 is a block diagram of a runtime environment 10 in which examples of scalable visualization of a containerized application in a multiple-cluster and multiple deployment application environment can be implemented. The runtime environment 10 includes a computing device 12, which in turn includes a processor device 14, a memory 16, and a display device 18. The memory 16 includes an introspection service 20. The introspection service 20, as will described in greater detail herein, implements introspection of a containerized application in a runtime environment. It is noted that while the introspection service 20 is a component of the computing device 12, functionality implemented by the introspection service 20 may be attributed to the computing device 12 generally. Moreover, in examples where the introspection service 20 comprises software instructions that program the processor device 14 to carry out functionality discussed herein, functionality implemented by the introspection service 20 may be attributed herein to the processor device 14. It is further noted that, while the examples will be described as being implemented on the computing device 12 by the introspection service 20, it is apparent that the introspection service 20 could comprise a number of different components, some of which may execute concurrently on other computing devices.

The runtime environment 10 includes a plurality of container orchestration systems 22-1-22-P (generally, container orchestration systems 22), each of which is configured to manage containerized applications across a corresponding cluster of nodes. The term "containerized application" as used herein refers to an application that comprises one or more container images, and is initiated and managed via a container orchestration system. When executed, a container image is initiated as a Linux® container, wherein the Linux® kernel features cgroups and namespaces are used to isolate processes from one another. A container image is often created from a containerization technology, such as, by way of non-limiting example, Docker®, or the like.

The term "container orchestration system" refers to a system that automates the deployment, scaling and management of containerized applications among nodes in a cluster. The Kubernetes® container orchestration system (Kubernetes.io) is one example of a container orchestration system. The term "resource" as used herein refers to any individual component managed by the container orchestration system for which, if requested, the container orchestration system will return information specific to the resource. In the Kubernetes® container orchestration system, each resource of an application is typically defined in a configuration file, such as a YAML Ain't Markup Language (YAML) file, and has a "kind" attribute (sometimes referred to herein as "type") and a "name" attribute.

It is noted that the examples will be discussed herein in the context of the Kubernetes® container orchestration system and utilize terminology used in the Kubernetes® container orchestration system; however, the examples are applicable to any container orchestration system capable of deploying, scaling, and managing containerized applications among nodes in a cluster.

The container orchestration system 22-1 implements a cluster 24-1 ("LOCAL_CLUSTER") that includes a master node 25-1 and a plurality of worker nodes 26-1-1-26-1-N. Each node 25-1, 26-1-1-26-1-N may comprise a computing host (e.g., a bare metal machine), or a virtual machine, and thus each includes a processor device and a memory which have been omitted from FIG. 1 due to space limitations. The container orchestration system 22-1 includes a cluster controller 28-1 that deploys, scales, and manages containerized applications by distributing containerized applications across the plurality of worker nodes 26-1-1-26-1-N. As will be discussed in greater detail below, the cluster controller 28-1 may deploy a containerized application in response to instructions from a deployment application that is configured to deploy containerized applications via interactions with the cluster controller 28-1. The container orchestration system 22-1 may comprise any suitable container orchestration system capable of deploying containerized applications across a cluster of nodes. The term "deploy" as used herein refers to an installation and/or set up process of a resource of a containerized application on a cluster but does not necessarily require that the resource be initiated and/or running.

While the container orchestration system 22-1, solely for purposes of illustration, is illustrated as being embodied in a single component identified as the cluster controller 28-1, in practice, the container orchestration system 22-1 may be implemented by any number of modules, and may be in part distributed across the worker nodes 26-1-1-26-1-N.

The container orchestration system 22-P implements a cluster 24-P ("UI_MANAGED_CLUSTER") that includes a master node 25-P and a plurality of worker nodes 26-2-1-26-2-M. The container orchestration system 22-P includes a cluster controller 28-P that deploys, scales, and manages containerized applications by distributing containerized applications across the plurality of nodes 26-2-1-26-2-M. While only two clusters 24-1 and 24-P are illustrated in the environment 10, the examples may be used in conjunction with any number of clusters 24. The clusters 24 may each be implemented in a same data center or in different data centers, including by different cloud service providers. For example, the cluster 24-1 may be implemented in an Amazon Web Services® (AWS®) cloud computing environment, and the cluster 22-P may be implemented in a Google cloud computing environment.

The runtime environment 10 includes a storage system 30 that includes one or more storage devices. The storage system 30 includes a repository 31 of a plurality of containerized applications 32-1-32-K (hereinafter "applications" for purposes of brevity, and generally referred to as applications 32). The applications 32 can be deployed on one or more of the clusters 24. The application 32-1 includes application information 29 in the form of one or more files 34-1-34-3, which define a corresponding plurality of pre-deployment resources 35-1-35-3 that will be deployed onto a cluster 24 to implement the application 32-1. The application 32-1 also includes at least one container image 36. In some implementations, the information in the files 34-1-34-3 that define the resources 35 may utilize a certain syntax or format, such as YAML. The container image 36 implements desired functionality for the containerized application 32-1, such as an online store functionality, a tax system functionality, a word processor functionality, or the like.

In this example, the containerized application 32-1 is a Kubernetes® application, and the file 34-1 defines a deployment (DMENT) resource; the file 34-2 defines a service resource; and the file 34-3 defines a route resource. As will be discussed in greater detail below, the files 34-1-34-3 are accessed in the process of deploying the resources 35-1-35-3 of the containerized application 32-1 onto one or more of the clusters 24-1-24-P.

An example of the contents of the file 34-1 is provided below in Table 1.

TABLE 1

```
apiVersion: apps/v1
  kind: Deployment
  metadata:
    name: helloworld-app-deploy
    labels:
      app: helloworld-app
  spec:
    selector:
      matchLabels:
        app: helloworld-app
    replicas: 1
    template:
      metadata:
        labels:
          app: helloworld-app
      spec:
        containers:
        - name: helloworld-app-container
          image: "quay.io/fxiang1/helloworld:0.0.1"
          imagePullPolicy: IfNotPresent
          ports:
            - containerPort: 3002
          env:
            - name: "PORT"
              value: "3002"
          resources:
            limits:
              cpu: 200m
              memory: 256Mi
            requests:
              cpu: 50m
              memory: 64Mi
```

The resource 35-1 defined by the file 34-1 is a Kubernetes® deployment resource and may include information such as the name and location of the container image 36, the name of the deployment resource (helloworld-app-deploy), a port number via which the container initiated from the container image 36 can be accessed, memory and processing limits for the container, a number of replicas, and the like, all of which may be used by a container orchestration system 22 during deployment of the containerized application 32-1. A deployment resource in Kubernetes® may be used, for example, to identify a desired number of copies of a container.

An example of the contents of the file 34-2 is provided below in Table 2.

TABLE 2

```
apiVersion: v1
  kind: Service
  metadata:
    name: helloworld-app-svc
    labels:
      app: helloworld-app
  spec:
    type: NodePort
    ports:
      - port: 3002
        targetPort: 3002
        protocol: TCP
    selector:
      app: helloworld-app
```

The resource 35-2 defined by the file 34-2 is a Kubernetes® service resource and may include information such as the name of the service resource (helloworld-app-svc), a port number via which the container initiated from the container image 36 can be accessed, and the like, all of which may be used by a container orchestration system 22 during deployment of the containerized application 32-1. A service resource in Kubernetes® is a mechanism for exposing a running container as a network service.

An example of the contents of file 34-3 is provided below in Table 3.

TABLE 3

```
kind: Route
apiVersion: route.openshift.io/v1
metadata:
    name: helloworld-app-route
    labels:
        app: helloworld-app
spec:
    to:
        kind: Service
        name: helloworld-app-svc
        weight: 100
    port:
        targetPort: 3002
    wildcardPolicy: None
```

The resource 35-3 defined by the file 34-3 is a Kubernetes® router resource and may include information such as the name of the route resource (helloworld-app-route), a port number via which the container initiated from the container image 36 can be accessed, and the like, all of which may be used by a container orchestration system 22 during deployment of the containerized application 32-1. A route service implements a mechanism to expose a service by giving the service an externally reachable hostname.

The storage system 30 may also include one or more deployment applications 38-1-38-J. The term "deployment application" as used herein refers to applications that are configured to deploy containerized applications onto one or more of the clusters 24 via interactions with the corresponding cluster controllers 28. Such interactions may be facilitated, for example, via an application programming interface (API) of the cluster controllers 28. Some or all of the deployment applications 38-1-38-J may be configured to deploy the containerized application 32-1 onto one or more of the clusters 24, and into predetermined namespaces on the clusters 24.

The deployment applications 38 may each be different types of deployment applications. As an example, the deployment application 38-1 may be an Argo deployment application and be identified by type "application.argoproj.io"; the deployment application 38-2 may be an Advanced Cluster Management (ACM) deployment application and be identified by type "application.app.k8s.io"; and the deployment application 38-3 may be a FLUX deployment application and be identified by type "application.flux.io". One or more of the deployment applications 38 may be associated with a continuous integration continuous deployment (CI/CD) that is configured to automatically deploy containerized applications from the storage system 30 as such containerized applications are developed and or modified.

The storage system 30 may also include a list 40 of the deployment applications 38. The list may identify the deployment applications 38 in any desired manner, such as by name, by type, or by any other characteristic that distinguishes the deployment applications 38.

For purposes of illustration, assume that only the deployment applications 38-1-38-3 have been deployed in the environment 10. The deployment application 38-1 has been deployed on the cluster 24-1. In this example, the deployment applications 38-1-38-J are also containerized applications. The cluster controller 28-1 causes a deployment application container 42-1 (hereinafter "deployment application 42-1") to be initiated on the node 26-1-1 from the deployment application 38-1, which in this example is a container image. In practice, in a Kubernetes® container orchestration system, the deployment application 42-1 would be implemented in a pod resource, but for purposes of simplicity, the pods associated with the deployment applications 42 have been omitted.

The cluster controller 28-1 also generates a deployment application resource 44-1 which corresponds to the deployment application 42-1 and which contains information about the deployment application 42-1. The information may be updated in real time and contain current configuration and runtime information about the deployment application 42-1, such as which containerized applications 32 have been deployed by the deployment application 42-1, the clusters 24 on which the containerized applications 32 have been deployed, and the namespaces on the clusters 24 to which the containerized applications 32 have been deployed. Upon request, the cluster controller 28-1 can provide the contents of the deployment application resource 44-1 to a requesting application to provide to the requesting application information about the real-time and configuration information. The contents may be formatted, for example, as YAML.

The deployment application 38-2 has also been deployed on the cluster 24-1. The cluster controller 28-1 causes a deployment application container 42-2 (hereinafter "deployment application 42-2") to be initiated on the node 26-1-1 from the deployment application 38-2, which in this example is a container image. The cluster controller 28-1 also generates a deployment application resource 44-2 which corresponds to the deployment application 42-2 and which contains information about the deployment application 42-2. Again, as discussed above with regard to the deployment application resource 44-1, the information may be updated in real time and contain current configuration and runtime information about the deployment application 42-2, such as which containerized applications 32 have been deployed by the deployment application 42-2, the clusters 24 on which the containerized applications 32 have been deployed, and the namespaces on the clusters 24 to which the containerized applications 32 have been deployed. Upon request, the cluster controller 28-1 can provide the contents of the deployment application resource 44-2 to a requesting application. The contents may be formatted, for example, as YAML.

The deployment application 38-3 has also been deployed on the cluster 24-P. The cluster controller 28-1 causes a deployment application container 42-3 (hereinafter "deployment application 42-3") to be initiated on the node 26-2-1 from the deployment application 38-3, which in this example is a container image. The cluster controller 28-P also generates a deployment application resource 44-3 which corresponds to the deployment application 42-3 and which contains information about the deployment application 42-3. Again, as discussed above with regard to the deployment application resource 44-1, the information may be updated in real time and contain current configuration and runtime information about the deployment application 42-3, such as which containerized applications 32 have been deployed by the deployment application 42-3, the clusters 24 on which the containerized applications 32 have been deployed, and the namespaces on the clusters 24 to which the containerized applications 32 have been deployed. Upon request, the cluster controller 28-P can provide the contents of the deployment application resource 44-3 to a requesting application. The contents may be formatted, for example, as YAML.

In this example, the deployment application 42-1 is configured to deploy the containerized application 32-1 onto the local cluster 24-1 in a namespace 46-1 (NAMESPACE1). A namespace is an isolation mechanism implemented by an operating system, such as the Linux operating system, to isolate applications from one another, to define name scope. Thus, applications executing in one namespace may be unaware of applications running in another namespace, even though such applications are running on the same host computer.

In this example, the deployment application 42-2 is configured to deploy the containerized application 32-1 onto the cluster 24-P in a namespace 46-2 (NAMESPACE2). The deployment application 42-3 is configured to deploy the containerized application 32-1 onto the cluster 24-P in a namespace 46-3 (NAMESPACE3). The clusters 24 and namespaces 46 to which the deployment applications 38 deploy the containerized application 32-1 may be preconfigured.

Based on configuration information, the deployment application 42-1 determines that the containerized application 32-1 is to be deployed to the cluster 24-1 and initiates one or more deployment commands to the cluster controller 28-1 to start the deployment process. In this example, wherein the container orchestration system 22-1 comprises the Kubernetes® container orchestration system, the deployment commands may comprise one or more KUBECTL APPLY commands that identify the files 34-1-34-3 and that indicate deployed resources should be generated in the namespace 46-1.

The deployment command(s) cause the cluster controller 28-1 to generate a plurality of deployed resources in the namespace 46-1 based on the pre-deployment resources 35-1-35-3 defined by the files 34-1-34-3. The deployed resources may comprise objects stored in memory that control aspects of how the containerized application 32-1 will operate. A single pre-deployment resource 35 defined in a file 34 may cause the deployment of a plurality of deployed resources. For example, the pre-deployment deployment resource 35-1 defined in the file 34-1 may cause the deployment of a deployed deployment resource, a deployed replicaset resource, and a deployed pod resource. The deployment command(s) also cause the cluster controller 28-1 to initiate one or more containers (i.e., running processes) on one or more of the nodes 26-1-1-26-1-N. In Kubernetes®, running containers are represented by a pod resource. In this example, the resources 35-1-35-3 defined in the files 34-1-34-3 cause the cluster controller 28-1 to deploy a deployment resource 48-1 based on the file 34-1, a service resource 50-1 based on the file 34-2, and a route resource 52-1 based on the file 34-3. Based on the deployment resource 48-1, the cluster controller 28-1 also deploys a replicaset resource 54-1, and a pod resource 56-1. The cluster controller 28-1 initiates a container 58-1 on the node 26-1-2 from the container image 36. The container 58-1 is represented by the pod resource 56-1. Each of the resources 48-1, 50-1, 52-1, 54-1, and 56-1 contain configuration and real-time information, such as status information, about the corresponding resource. Upon request, the cluster controller 28-1 can provide the contents of the resources 48-1, 50-1, 52-1, 54-1, and 56-1 to a requesting application to provide the requesting application information about the real-time and configuration information. The contents may be formatted, for example, as YAML. Although for purposes of illustration the resources 48-1, 50-1, 52-1, 54-1, and 56-1 are illustrated as existing on the master node 25-1, in practice, the resources 48-1, 50-1, 52-1, 54-1, and 56-1 may be stored on one or more of the worker nodes 26-1-1-26-1-N.

In a similar manner, based on configuration information, the deployment application 42-2 determines that the containerized application 32-1 is to be deployed to the cluster 24-P and initiates one or more deployment commands to the cluster controller 28-P to deploy the containerized application 32-1 in the namespace 46-2. The deployment command(s) cause the cluster controller 28-P to deploy a deployment resource 48-2 based on the file 34-1, a service resource 50-2 based on the file 34-2, and a route resource 52-2 based on the file 34-3. Based on the deployment resource 48-2, the cluster controller 28-P also deploys a replicaset resource 54-2, and pod resource 56-2. The cluster controller 28-P initiates a container 58-2 on the node 26-2-2 from the container image 36. Each of the resources 48-2, 50-2, 52-2, 54-2, and 56-2 contain configuration and real-time information about the corresponding resource.

In a similar manner, based on configuration information, the deployment application 38-3 determines that the containerized application 32-1 is to be deployed to the cluster 24-P and initiates one or more deployment commands to the cluster controller 28-P to deploy the containerized application 32-1 in the namespace 46-3. The deployment command(s) cause the cluster controller 28-P to deploy a deployment resource 48-3 based on the file 34-1, a service resource 50-3 based on the file 34-2, and a route resource 52-3 based on the file 34-3. Based on the deployment resource 48-3, the cluster controller 28-P also generates a replicaset resource 54-3, and pod resource 56-3. The cluster controller 28-P initiates a container 58-3 on the node 26-2-M from the container image 36. Each of the resources 48-3, 50-3, 52-3, 54-3 and 56-3 contain configuration and real-time information about the corresponding resource.

The introspection service 20 is configured to identify the deployment applications 38 that are configured to deploy a containerized application 32, determine the clusters 24 and namespaces 46 onto which the containerized application 32 is to be deployed, and determine whether the containerized application 32 has been successfully deployed to each cluster 24 and namespace 46. The introspection service 20 generates user interface imagery and presents the user interface imagery onto the display device 18 providing information regarding the deployment applications 38, the clusters 24 and the resources of the containerized application 32 to provide a user, such as an operator, intuitive visual information that allows the operator to rapidly determine the state of the deployment of the containerized application 32 across multiple clusters and that have been deployed by multiple application deployment applications 38. As will be described in greater detail below, the operator may interact with the introspection service 20 to obtain detailed information about the deployment applications 38, the clusters 24, and the resources of the containerized application 32.

For purposes of illustration, assume that an operator desires to determine the deployment status of the containerized application 32-1. The operator enters appropriate information into the introspection service 20 that identifies the containerized application 32-1. The introspection service 20 accesses the list 40 to identify the deployment applications that may be configured to deploy the containerized application 32-1. The introspection service 20 identifies the clusters 24-1-24-P. In some implementations, one of the clusters 24-1-24-P may be identified as a "hub" cluster that is aware of all the clusters 24-1-24-P. In this example, the cluster 24-1 has been designated as the "hub" cluster, and the introspection service 20 queries the cluster controller 28-1 to determine the existence of and location information for the clusters 24-1-24-P. The cluster controller 28-1 accesses cluster information 60-1 that identifies the clusters 24-1-24-P and the locations of such clusters 24-1-24-P so that the introspection service 20 can communicate with the cluster controllers 28 of such clusters 24.

The introspection service 20 sends queries to the cluster controllers 28-1-28-P for deployment information regarding the deployment applications 38-1-38-J identified in the list 40. Based on the responses, the introspection service 20 determines on which cluster 24-1-24-P any deployment applications 38-1-38-J have been deployed. In this example, assume that there are a total of five clusters 24-1-24-P, and based on responses from the five cluster controllers 28-1-28-P, the introspection service 20 determines that the deployment applications 38-1 and 38-2 have been deployed on the cluster 24-1 as the deployment applications 42-1 and 42-2, respectively, and that the deployment application 38-3 has been deployed to the cluster 24-P as the deployment application 42-3. Throughout the process described herein, the introspection service 20 may store collected information in a location, such as application resource deployment information 62, for subsequent processing and consolidation as described in greater detail below.

The information returned by the cluster controller 28-1 in response to the query from the introspection service 20 includes application information in the form of the contents of the deployment application resources 44-1 and 44-2. Table 4 provides an example of the content of the deployment application resource 44-1 that may be returned to the introspection service 20.

TABLE 4

```
apiVersion: argoproj.io/v1alpha1
kind: Application
metadata:
   creationTimestamp: '2021-09-20T19:39:52Z'
   generation: 901
   managedFields:
   ...
      manager: argocd-server
      operation: Update
      time: '2021-09-20T19:39:52Z'
   - apiVersion: argoproj.io/v1alpha1
      fieldsType: FieldsV1   manager: argocd-application-controller
      operation: Update
      time: '2021-09-20T19:40:39Z'
   name: helloworld-local
   namespace: openshift-gitops
   resourceVersion: '115148966'
   selfLink: >-
      /apis/argoproj.io/v1alpha1/namespaces/openshift-
gitops/applications/helloworld-local
   uid: 41aae746-cbb3-48ba-a069-1b4035a12c40
spec:
   destination:
      name: local-cluster
      namespace: namespace1
   project: default
   source:
      path: helloworld
      repoURL: https://github.com/fxiang1/app-samples.git
      targetRevision: HEAD
   syncPolicy:
      automated:
```

TABLE 4-continued

```
         prune: true
         selfHeal: true
      syncOptions:
         - CreateNamespace=true
   ...
         - group: ''
            hookPhase: Running
            kind: Service
            message: service/helloworld-app-svc created
            name: helloworld-app-svc
            namespace: namespace 1
            status: Synced
            syncPhase: Sync
            version: v1
         - group: apps
            hookPhase: Running
            kind: Deployment
            message: deployment.apps/helloworld-app-deploy created
            name: helloworld-app-deploy
            namespace: namespace1
status: Synced
            syncPhase: Sync
            version: v1
         - group: route.openshift.io
            hookPhase: Running
            kind: Route
            message: route.route.openshift.io/helloworld-app-route created
            name: helloworld-app-route
            namespace: namespace1
            status: Synced
            syncPhase: Sync
            version: v1
         revision: 5d6519b9d9e20542f5d5551403c924ba8fbf7cf2
         source:
            path: helloworld
            repoURL: https://github.com/fxiang1/app-samples.git
            targetRevision: HEAD
      reconciledAt: '2021-09-22T18:37:36Z'
      resources:
         - health:
               status: Healthy
            kind: Service
            name: helloworld-app-svc
            namespace: namespace1
            status: Synced
            version: v1
         - group: apps
            health:
               status: Healthy
            kind: Deployment
            name: helloworld-app-deploy
            namespace: namespace1
            status: Synced
            version: v1
         - group: route.openshift.io
            kind: Route
            name: helloworld-app-route
            namespace: namespace 1
            status: Synced
            version: v1
      sourceType: Directory
      summary:
         images:
            - quay.io/fxiang1/helloworld:0.0.1
      sync:
         comparedTo:
            destination:
               name: local-cluster
               namespace: namespace 1
            source:
               path: helloworld
               repoURL: https://github.com/fxiang1/app-samples.git
               targetRevision: HEAD
         revision: 5d6519b9d9e20542f5d5551403c924ba8fbf7cf2
         status: Synced
```

The introspection service 20 parses the content of the deployment application resource 44-1 to identify the clusters 24 to which the deployment application 42-1 deploys the containerized application 32-1 and the namespaces 46 in which the deployment application 42-1 deploys the containerized application 32-1. As indicated in Table 4, the deployment application 42-1 deploys the containerized application 32-1 ("helloworld-app") to the cluster 24-1 ("local-cluster") and in the namespace namespace1. The introspection service 20 similarly parses the content of deployment application resources 44-2 and 44-3 returned by the cluster controllers 28-1 and 28-2, respectively.

Based on the analysis of the deployment application resources 44-1 and 44-3, the introspection service 20 determines that the deployment application 42-1 has deployed the containerized application 32-1 to the cluster 24-1 in the namespace 46-1 as the resources 48-1 (helloworld-app-deploy), 50-1 (helloworld-app-svc), and 52-1 (helloworld-app-route); the deployment application container 42-2 has deployed the containerized application 32-1 to the cluster 24-P in the namespace 46-2, and the deployment application container 42-3 has deployed the containerized application to the cluster 24-P in the namespace 46-3. Thus, a total of three deployment applications 38 have deployed the containerized application 32-1 to a total of two clusters 24-1 and 24-P.

The introspection service 20 then requests, based on the information obtained from the deployment application resource 44-1, from the cluster controller 28-1, the deployment resource 48-1, the service resource 50-1, and the route resource 52-1. The deployment resource 48-1 identifies the name of the replicaset resource 54-1, from which the name of the pod resource 56-1 can be determined. The introspection service 20 then obtains the pod resource 56-1 from the cluster controller 28-1. The pod resource 56-1 identifies the status of the container 58-1.

Table 5 contains an example of the deployment resource 48-1.

TABLE 5

```
kind: Deployment
apiVersion: apps/v1
metadata:
  name: helloworld-app-deploy
  namespace: namespace 1
...
  managedFields:
    - manager: argocd-application-controller
      operation: Update
      apiVersion: apps/v1
      time: '2021-09-20T19:40:34Z'
      fieldsType: FieldsV1
      fieldsV1:
...
        f:spec:
          f:containers:
            k:{"name":"helloworld-app-container"}:
...
              f:ports:
                .: { }
                k:{"containerPort":3002,"protocol":"TCP"}:
                  .: { }
                  f:containerPort: { }
                  f:protocol: { }
...
    - manager: kube-controller-manager
spec:
  replicas: 1
  selector:
    matchLabels:
      app: helloworld-app
  template:
    metadata:
      creationTimestamp: null
      labels:
        app: helloworld-app
```

TABLE 5-continued

```
spec:
  containers:
    - name: helloworld-app-container
      image: quay.io/fxiang1/helloworld:0.0.1
      ports:
        - containerPort: 3002
          protocol: TCP
      env:
        - name: PORT
          value: '3002'
      resources:
        limits:
          cpu: 200m
          memory: 256Mi
        requests:
          cpu: 50m
          memory: 64Mi
...
status:
  observedGeneration: 1
  replicas: 1
  updatedReplicas: 1
  readyReplicas: 1
  availableReplicas: 1
  conditions:
    - type: Available
      status: 'True'
      lastUpdateTime: '2021-09-20T19:40:38Z'
      lastTransitionTime: '2021-09-20T19:40:38Z'
      reason: MinimumReplicasAvailable
      message: Deployment has minimum availability.
    - type: Progressing
      status: 'True'
      lastUpdateTime: '2021-09-20T19:40:38Z'
      lastTransitionTime: '2021-09-20T19:40:34Z'
      reason: NewReplicaSetAvailable
      message: >-
        ReplicaSet "helloworld-app-deploy-b855684db" has successfully
        progressed.
```

The introspection service 20 can determine the status of the resources 48-1, 50-1, 52-1, 54-1, and 56-1 based on the information returned by the cluster controller 28-1. The introspection service 20 repeats the process with the cluster controller 28-P to determine the status of the deployment of the containerized application 32-1 in the namespace 46-2 of the cluster 24-P, and the deployment of the containerized application 32-1 in the namespace 46-3 of the cluster 24-P.

The introspection service 20 may generate, based on the obtained information, user interface imagery 64 that includes information that identifies a set of the resources 48-1, 50-1, 52-1, 54-1, and 56-1, identifies the total number of the deployment applications 38-1-38-J that are configured to deploy the resources 48-1, 50-1, 52-1, 54-1, and 56-1 onto at least one cluster 24, and that identifies the total number of clusters 24 onto which the resources 48-1, 50-1, 52-1, 54-1, and 56-1 were to be deployed. The introspection service 20 may then present, on the display device 18, the user interface imagery 64. In this manner, an operator can quickly and easily ascertain the total number of deployment applications 38 that have deployed the containerized application 32-1, the number of clusters 24 on which the containerized application 32-1 has been deployed, and a set of resources 48-1, 50-1, 52-1, 54-1, and 56-1 that make up the containerized application 32-1.

Figure 2:
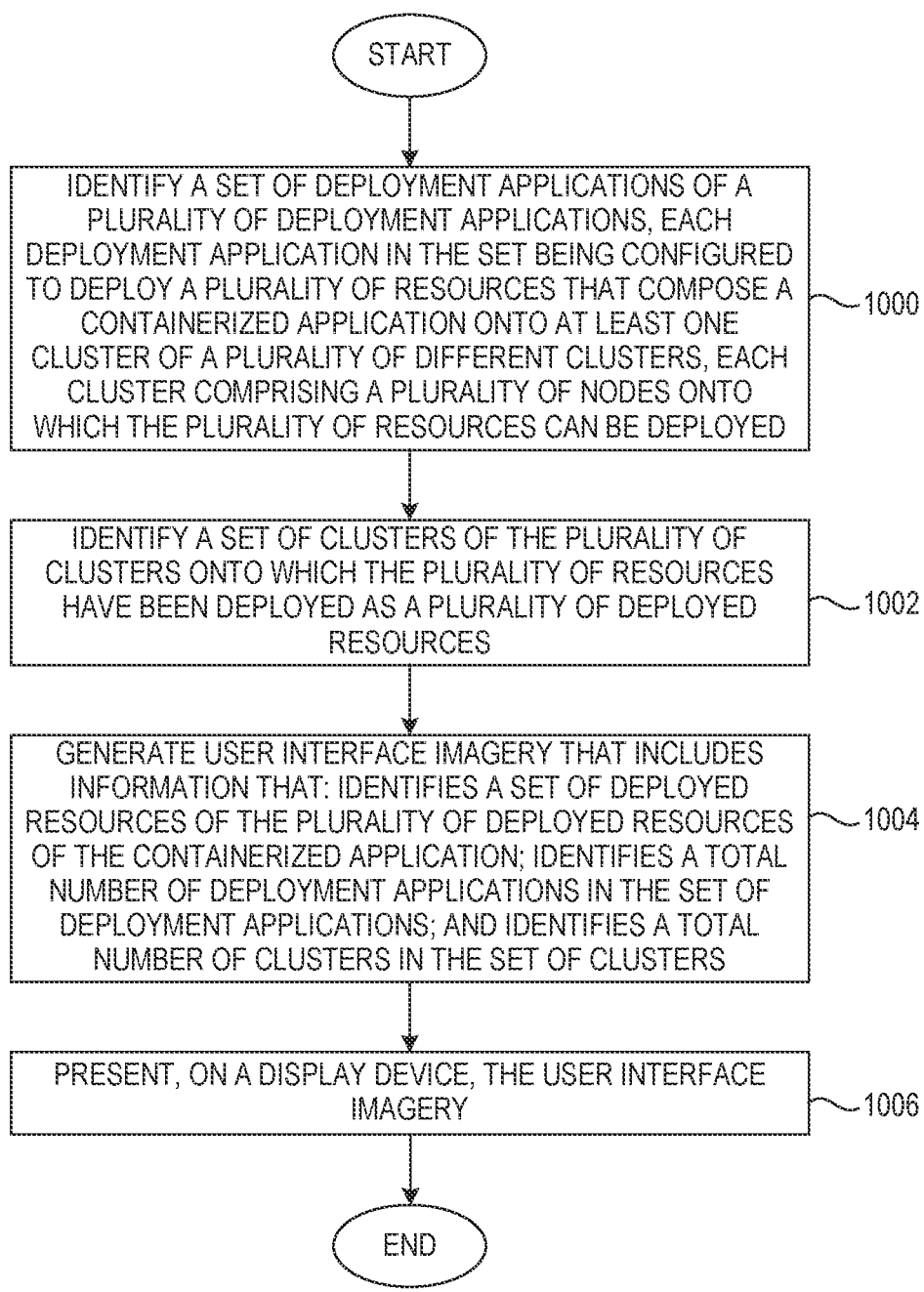
FIG. 2 is a flowchart of a method for introspection of an application in the multiple-cluster and multiple deployment application environment according to one example.

FIG. 2 is a flowchart of a method for introspection of the application 32-1 in the multiple-cluster and multiple deployment application runtime environment 10 according to one implementation. FIG. 2 will be discussed in conjunction with FIG. 1. The computing device 12 identifies the set of deployment applications 38-1-38-3 that are configured to deploy the plurality of resources 35-1-35-3 that compose the containerized application 32-1 onto at least one cluster 24 of a plurality of different clusters 24, each cluster 24 including a plurality of worker nodes 26 onto which the resources 35-1-35-3 can be deployed (FIG. 2, block 1000). In this example, three of the deployment applications 38-1-38-J are configured to deploy the plurality of resources 35-1-35-3. The computing device 12 identifies a set of the clusters 24 of the plurality of clusters 24 onto which the plurality of resources 35-1-35-3 have been deployed as the plurality of resources 48-1, 50-1, 52-1, 54-1, and 56-1 (FIG. 2, block 1002). The computing device 12 generates the user interface imagery 64 that includes information that: identifies a set of the plurality of deployed resources 48-1, 50-1, 52-1, 54-1, and 56-1 of the containerized application 32-1; identifies a total number of deployment applications 38 in the set of deployment applications 38; and identifies a total number of clusters 24 in the set of clusters 24. (FIG. 2, block 1004). The computing device 12 presents, on the display device 18, the user interface imagery 64.

Referring again to FIG. 1, the introspection service 20 may request the cluster information 60-1 from the cluster controller 28-1 to obtain information, including status information, about the cluster 24-1. The cluster information 60-1 may indicate, for example, whether the cluster 24-1 has a status of "healthy" or "offline", or the like. The introspection service 20 also requests the cluster information 60-P from the cluster controller 28-P to obtain information about the cluster 24-P.

After the introspection service 20 has obtained the contents of the resources of the containerized application 32-1 that have been deployed to the clusters 24-1 and 24-P, as discussed above, as well as the contents of the deployment application resources 44-1-44-3 and the cluster information 60-1 and 60-P, the introspection service 20 may generate user interface imagery that provides information gleaned from such information.

Figure 3A:
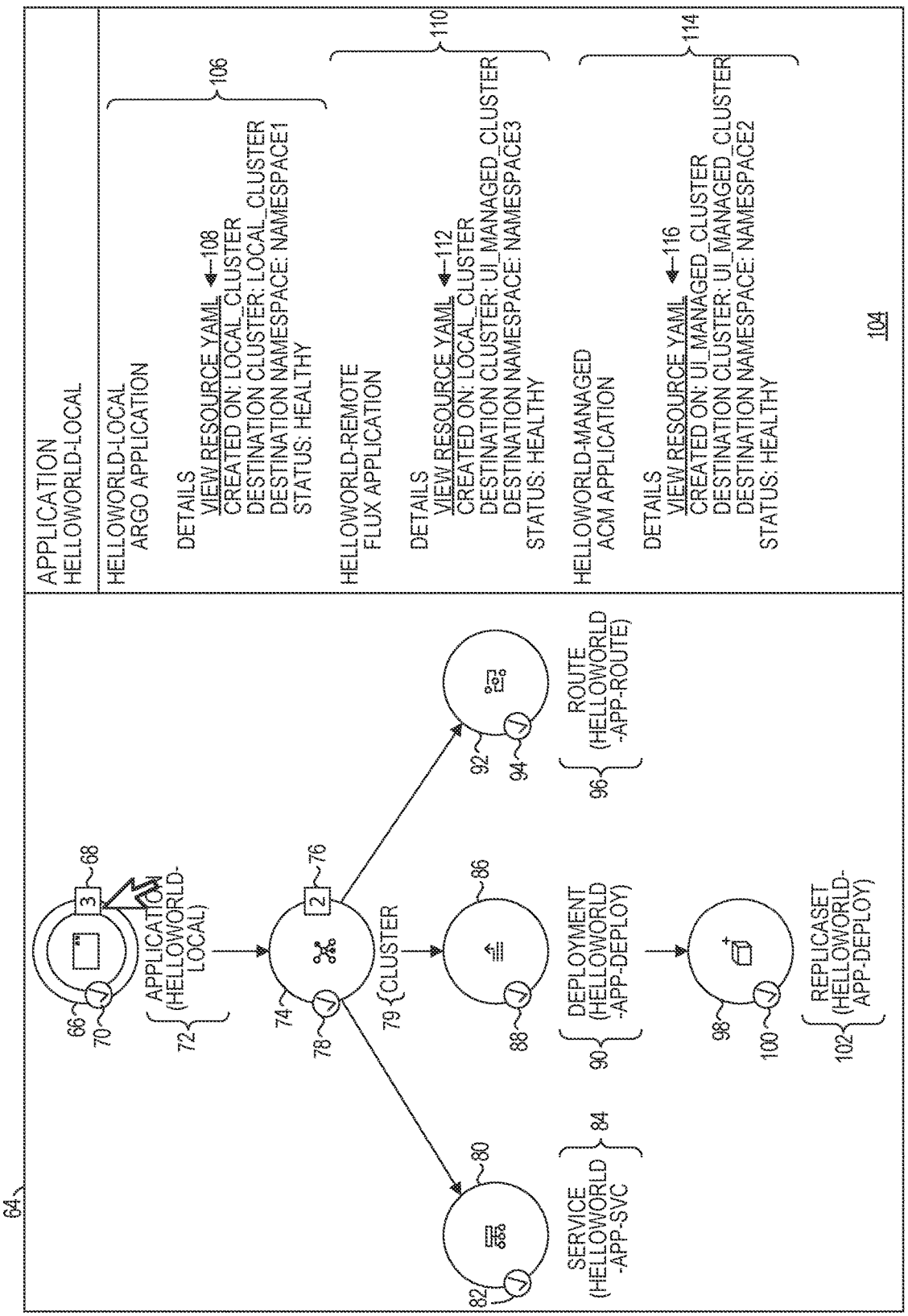
FIGS. 3A-3C illustrate various user interface imagery that may be presented on a display device according to one example.
Figure 3B:
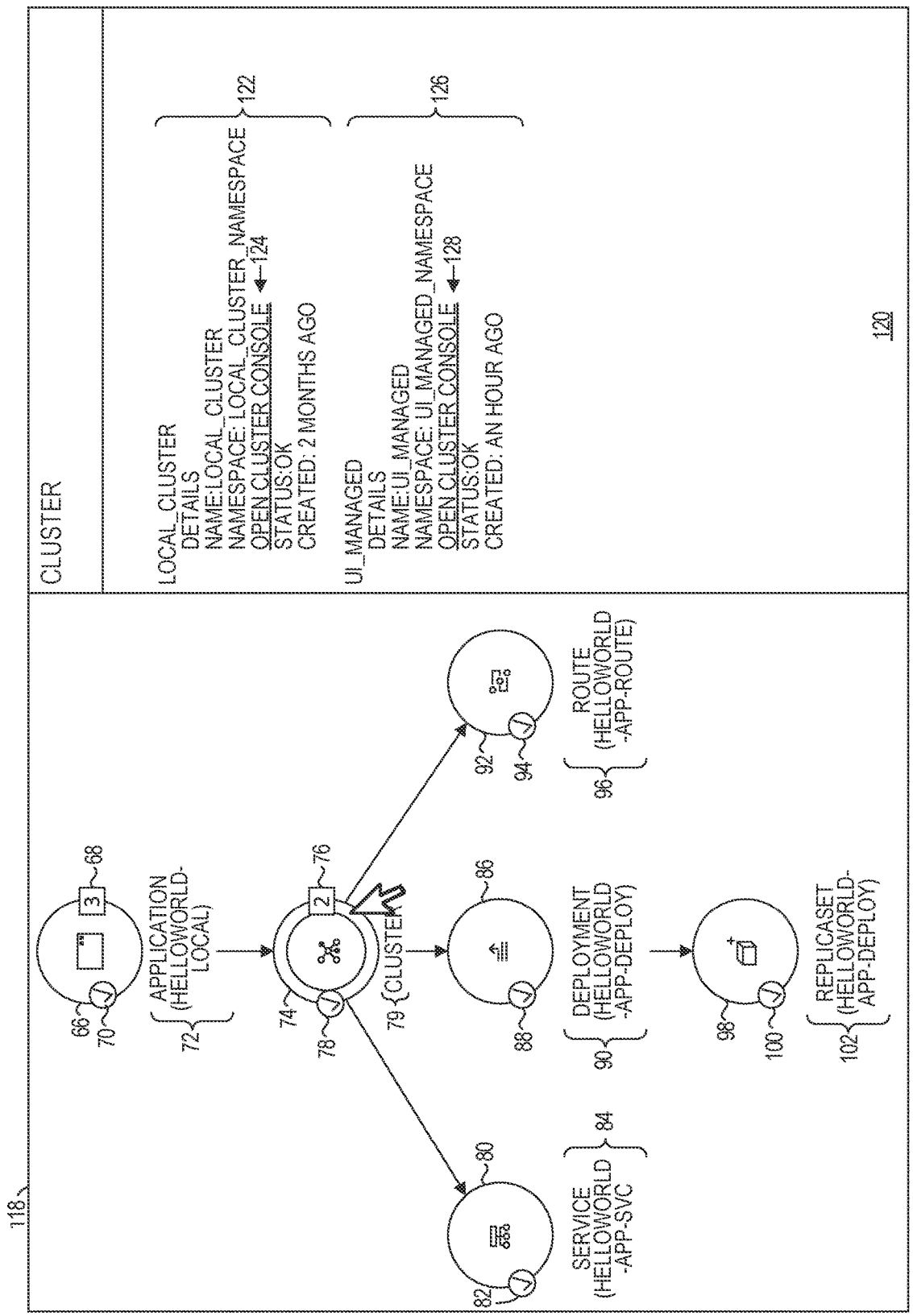
Figure 3C:
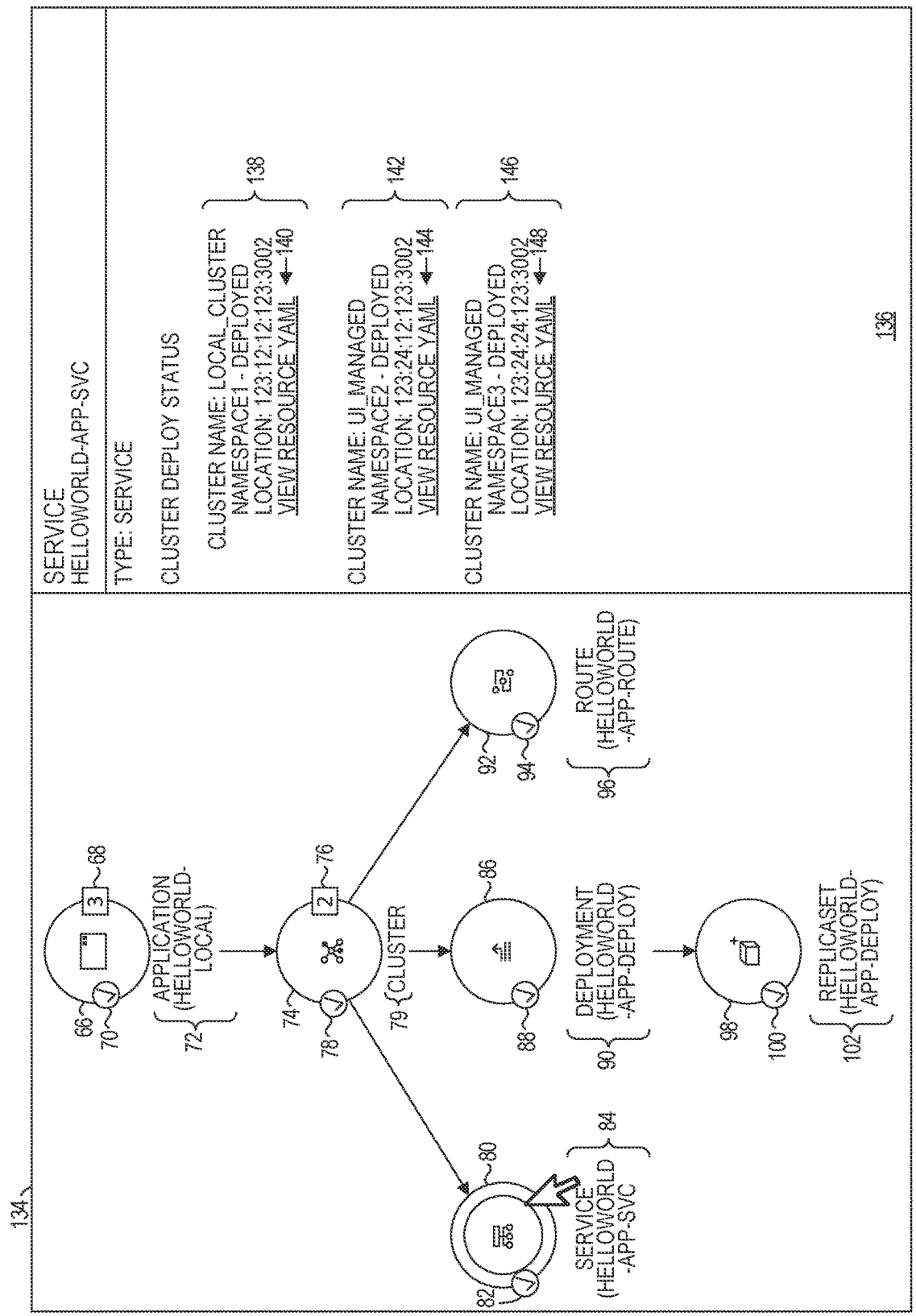

FIGS. 3A-3C illustrate various user interface imagery that may be presented on the display device 18 in accordance with one implementation. Referring first to FIG. 3A, in response to an operator input, the introspection service 20 may generate the initial user interface imagery 64 that includes an application deployment icon 66 that represents each deployment application 38 that is configured to deploy the containerized application 32-1. Note that there is a single application deployment icon 66 irrespective of the number of deployment applications 38 that are configured to deploy the containerized application 32.

A deployment application count 68 identifies the number of deployment applications 38 of the plurality of deployment applications 38 that are configured to deploy the containerized application 32-1 onto the clusters 24. In this example, since each of the three deployment applications 38 are configured to deploy the containerized application 32-1 onto the clusters 24, the deployment application count 68 depicts a value of three.

A successful deployment indicator 70 indicates that each of the deployment applications 38-1-38-3 have been successfully deployed as the deployment applications 42-1-42-3. This information may be determined by the introspection service 20 from the deployment application resources 44-1, 44-2 and 44-3. A different indicator may be used to indicate that one or more of the deployment applications 38-1-38-3 was not deployed successfully. Text 72 identifies the name (helloworld-local) of one of the three deployment applications 38-1-38-3.

The user interface imagery 64 includes a cluster resource icon 74 that represents the set of clusters 24-1 and 24-P onto which the deployment applications 38 are configured to deploy the containerized application 32-1. A cluster count 76 identifies the number of clusters 24 to which the containerized application 32-1 is to be deployed. In this example, since the deployment applications 38 are configured to deploy the containerized application 32-1 to two clusters 24, the cluster count 76 depicts a value of two. A cluster status indicator 78 indicates that each of the clusters 24-1 and 24-P have a status of healthy. This information may be determined by the introspection service 20 from the cluster information 60-1 and 60-P. A different indicator may be used to indicate that one or more of the clusters 24-1 and 24-P is not healthy. Text 79 identifies the cluster resource icon 74 as corresponding to clusters 24 onto which the containerized application 32-1 is to be deployed.

A service resource icon 80 corresponds to and represents the service resources 50-1-50-3, and includes a successful deployment indicator 82 to indicate that the service resource 35-2 was successfully deployed as the service resources 50-1-50-3 in the correct namespaces of the clusters 24-1 and 24-P. A different indicator may be used to indicate that the service resource 35-2 was not deployed successfully into one or more of the namespaces on the cluster 24-1 or the cluster 24-P. This may happen, for example, if the cluster 24-1 or 24-P is in an inactive state. The deployment state of the service resources 50-1-50-3 may be determined from the content of the service resources 50-1-50-3 provided by the cluster controllers 28-1 and 28-P to the introspection service 20. Text 84 identifies the resource kind (service) and the name (helloworld-app-svc) of the service resources 50-1-50-3.

A deployment resource icon 86 corresponds to and represents the deployment resources 48-1-48-3, and includes a successful deployment indicator 88 to indicate that the deployment resource 35-1 was successfully deployed as the deployment resources 48-1-48-3 in the correct namespaces of the clusters 24-1 and 24-P. A different indicator may be used to indicate that the deployment resource 35-1 was not deployed successfully into one or more of the namespaces 46 on the clusters 24-1 or the cluster 24-P. This may happen, for example, if the cluster 24-1 or 24-P is in an inactive state. The deployment state of the deployment resources 48-1-48-3 may be determined from the content of the deployment resources 48-1-48-3 provided by the cluster controllers 28-1 and 28-P to the introspection service 20. Text 90 identifies the resource kind (deployment) and the name (helloworld-app-deploy) of the deployment resources 48-1-48-3.

A route resource icon 92 corresponds to and represents the route resources 52-1-52-3, and includes a successful deployment indicator 94 to indicate that the route resource 35-3 was successfully deployed as the route resources 52-1-52-3 in the correct namespaces 46 of the clusters 24-1 and 24-P. A different indicator may be used to indicate that the route resource 35-3 was not deployed successfully into one or more of the namespaces 46 on the clusters 24-1 or the cluster 24-P. This may happen, for example, if the cluster 24-1 or 24-P is in an inactive state. The deployment state of the route resources 52-1-52-3 may be determined from the content of the route resources 52-1-52-3 provided by the cluster controllers 28-1 and 28-P to the introspection service 20. Text 96 identifies the resource kind (route) and the name (helloworld-app-route) of the route resources 52-1-52-3.

Based on the content of the deployment resources 48-1-48-3, the cluster controllers 28-1 and 28-P deployed the replicaset resources 54-1-54-3. A replicaset resource icon 98 corresponds to the replicaset resources 54-1-54-3 and includes a successful deployment indicator 100 to indicate that the replicaset resources 54-1-54-3 have been successfully deployed on the clusters 24-1 and 24-P. Text 102 identifies the resource kind (replicaset) and the name (helloworld-app-deploy) of the replicaset resources 54-1-54-3, which is the same name of the deployment resources 48-1-48-3 that caused the deployment of the replicaset resources 54-1-54-3.

The introspection service 20 may also automatically, or in response to a user input selecting the application deployment icon 66, include in the user interface imagery 64 information 104 about the deployment applications 42-1-42-3. A section 106 provides information about the deployment application 42-1 that has been deployed on the cluster 24-1. The section 106 includes information that identifies the name and type of deployment application of the deployment application 42-1, in this case, the deployment application 42-1 has a name of "helloworld-local" and a type of ARGO. The section 106 includes information that identifies where the deployment application 42-1 was deployed, in this case the cluster 24-1, the clusters and namespaces to which the deployment application 42-1 is configured to deploy the containerized application 32-1, in this case, the namespace 46-1 and the cluster 24-1, and a status of the deployment application 42-1, in this example, healthy. This information may be determined by the introspection service 20 from the deployment application resource 44-1. The section 106 also includes a selectable control 108 that, upon selection, causes the introspection service 20 to present the contents of the deployment application resource 44-1.

A section 110 provides information about the deployment application 42-2 that has been deployed on the cluster 24-1. The section 110 includes information that identifies the name and type of deployment application of the deployment application 42-2, in this case, the deployment application 42-2 has a name of "helloworld-remote" and a type of FLUX. The section 110 includes information that identifies where the deployment application 42-2 was deployed, in this case the cluster 24-1, the clusters and namespaces to which the deployment application 42-2 is configured to deploy the containerized application 32-1, in this case, the namespace 46-3 and the cluster 24-P, and a status of the deployment application 42-2, in this example, healthy. This information may be determined by the introspection service 20 from the deployment application resource 44-2. The section 110 also includes a selectable control 112 that, upon selection, causes the introspection service 20 to present the contents of the deployment application resource 44-2.

A section 114 provides information about the deployment application 42-3 that has been deployed on the cluster 24-P. The section 114 includes information that identifies the name and type of deployment application of the deployment application 42-3, in this case, the deployment application 42-3 has a name of "helloworld-managed" and a type of ACM. The section 114 includes information that identifies where the deployment application 42-3 was deployed, in this case the cluster 24-P, the clusters and namespaces to which the deployment application 42-3 is configured to deploy the containerized application 32-1, in this case, the namespace 46-2 and the cluster 24-P, and a status of the deployment application 42-3, in this example, healthy. This information may be determined by the introspection service 20 from the deployment application resource 44-3. The section 114 also includes a selectable control 116 that, upon selection, causes the introspection service 20 to present the contents of the deployment application resource 44-3.

Assume for purposes of illustration that the operator selects the cluster resource icon 74, such as by using a mouse or other input mechanism. Referring now to FIG. 3B, in response to the selection of the cluster resource icon 74, the introspection service 20 generates and presents user interface imagery 118 on the display device 18. The user interface imagery 118 is substantially similar to the user interface imagery 64 illustrated in FIG. 3A, except an information section 120 now contains information about the clusters 24-1 and 24-P. A section 122 includes information regarding the cluster 24-1, including the name of the cluster 24-1, the name of the namespace used by the cluster 24-1, in this example, "LOCAL_CLUSTER_NAMESPACE", and the status of the cluster 24-1, in this example, "OK". A selectable control 124 can be selected by a user to be presented with a cluster console for the cluster 24-1.

A section 126 includes information regarding the cluster 24-P, including the name of the cluster 24-P, the name of the namespace used by the cluster 24-P, in this example, "UI_MANAGED_NAMESPACE", and the status of the cluster 24-P, in this example, "OK". A selectable control 128 can be selected by a user to be presented with a cluster console for the cluster 24-P.

Assume for purposes of illustration that the operator selects the service resource icon 80. Referring now to FIG. 3C, in response to the selection of the service resource icon 80, the introspection service 20 generates and presents user interface imagery 134 on the display device 18. The user interface imagery 134 is substantially similar to the user interface imagery 118 illustrated in FIG. 3B, except an information section 136 now contains information about the deployment status of the service resources 50-1-50-3 in the namespaces 46-1-46-3 on the clusters 24-1 and 24-P. A section 138 indicates that the service resource 50-1 has been successfully deployed in the namespace 46-1 on the cluster 24-1. A selectable control 140 can be selected by a user to be presented with the content of the service resource 50-1 in a YAML format.

Table 6 provides an example of the contents of the service resource 50-1 that may be presented to the user upon selection of the selectable control 140.

TABLE 6

```
kind: Service
apiVersion: v1
metadata:
    name: helloworld-app-svc
    namespace: namespace1
    selfLink: /api/v1/namespaces/argo-test-ns-1/services/helloworld-app-svc
    uid: 8de579a8-4100-44d7-8205-ba51ae967378
    resourceVersion: '19275108'
    creationTimestamp: '2021-07-30T13:33:16Z'
    labels:
        app: helloworld-app
        app.kubernetes.io/instance: helloworld-argo-app-1
    annotations:
        kubectl.kubernetes.io/last-applied-configuration: >
{"apiVersion":"v1", "kind":"Service","metadata":{"annotations":{ },
"labels":{"app":"helloworld-app","app.kubernetes.io/instance":"helloworld-
argo-app-1"},"name":"helloworld-app-svc","namespace":"argo-test-ns-
1"},"spec":{"ports":[{"port":3002,"protocol":"TCP","targetPort":3002}],
"selector":{"app":"helloworld-app"},"type":"NodePort"}}
    managedFields:
        - manager: argocd-application-controller
          operation: Update
          apiVersion: v1
          time: '2021-07-30T13:33:16Z'
          fieldsType: FieldsV1
          fieldsV1:
            f:metadata:
                f:annotations:
                    .:{ }
                    f:kubectl.kubernetes.io/last-applied-configuration: { }
```

TABLE 6-continued

```
    f:labels:
        .:{ }
        f:app: { }
        f:app.kubernetes.io/instance: { }
    f:spec:
        f:externalTrafficPolicy: { }
        f:ports:
            .: { }
            k:{"port":3002,"protocol":"TCP"}:
                .: { }
                f:port: { }
                f:protocol: { }
                f:targetPort: { }
        f:selector:
            .: { }
            f:app: { }
        f:sessionAffinity: { }
        f:type: { }
spec:
  ports:
    - protocol: TCP
      port: 3002
      targetPort: 3002
      nodePort: 32217
    selector:
      app: helloworld-app
    clusterIP: 172.30.198.100
    clusterIPs:
      - 172.30.198.100
    type: NodePort
    sessionAffinity: None
    externalTrafficPolicy: Cluster
status:
    loadBalancer: { }a cluster console for the cluster 24-P.
```

A section 142 indicates that the service resource 50-2 has been successfully deployed in the namespace 46-2 on the cluster 24-P. A selectable control 144 can be selected by a user to be presented with the content of the service resource 50-2 in a YAML format. A section 146 indicates that the service resource 50-3 has been successfully deployed in the namespace 46-3 on the cluster 24-P. A selectable control 148 can be selected by a user to be presented with the content of the service resource 50-3 in a YAML format.

The introspection service 20 may repeatedly poll the appropriate resources of the clusters 24-1 and 24-P, and the cluster information 60-1 and 60-P, and alter the user interface imagery 134 based on any changes in the deployment status of the containerized application 32-1, the status of the deployment applications 42-1-42-3, or the clusters 24-1 and 24-P.

Figure 4A:
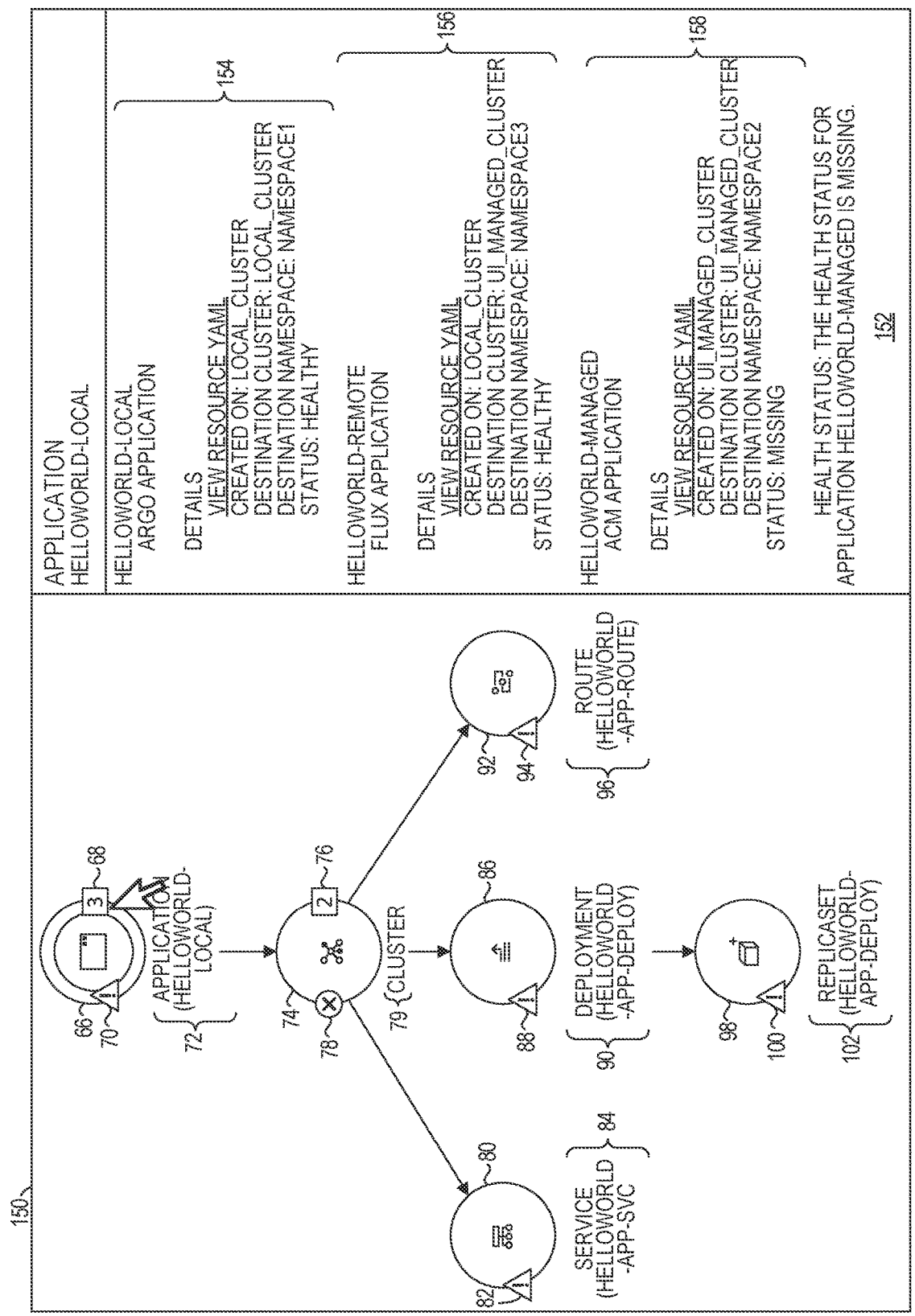
FIGS. 4A-4C illustrate various user interface imagery that may be presented on the display device according to another example.
Figure 4B:
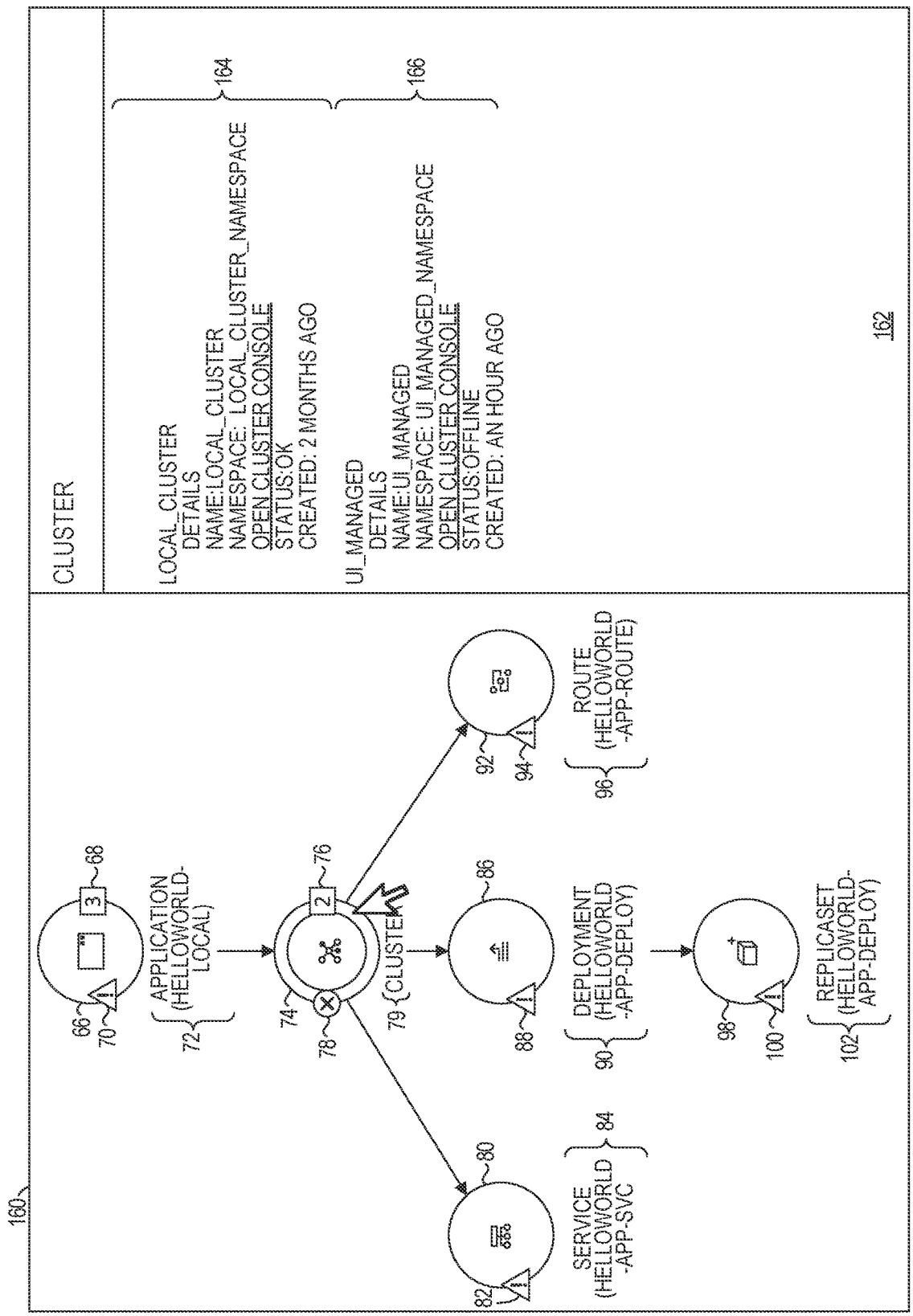
Figure 4C:
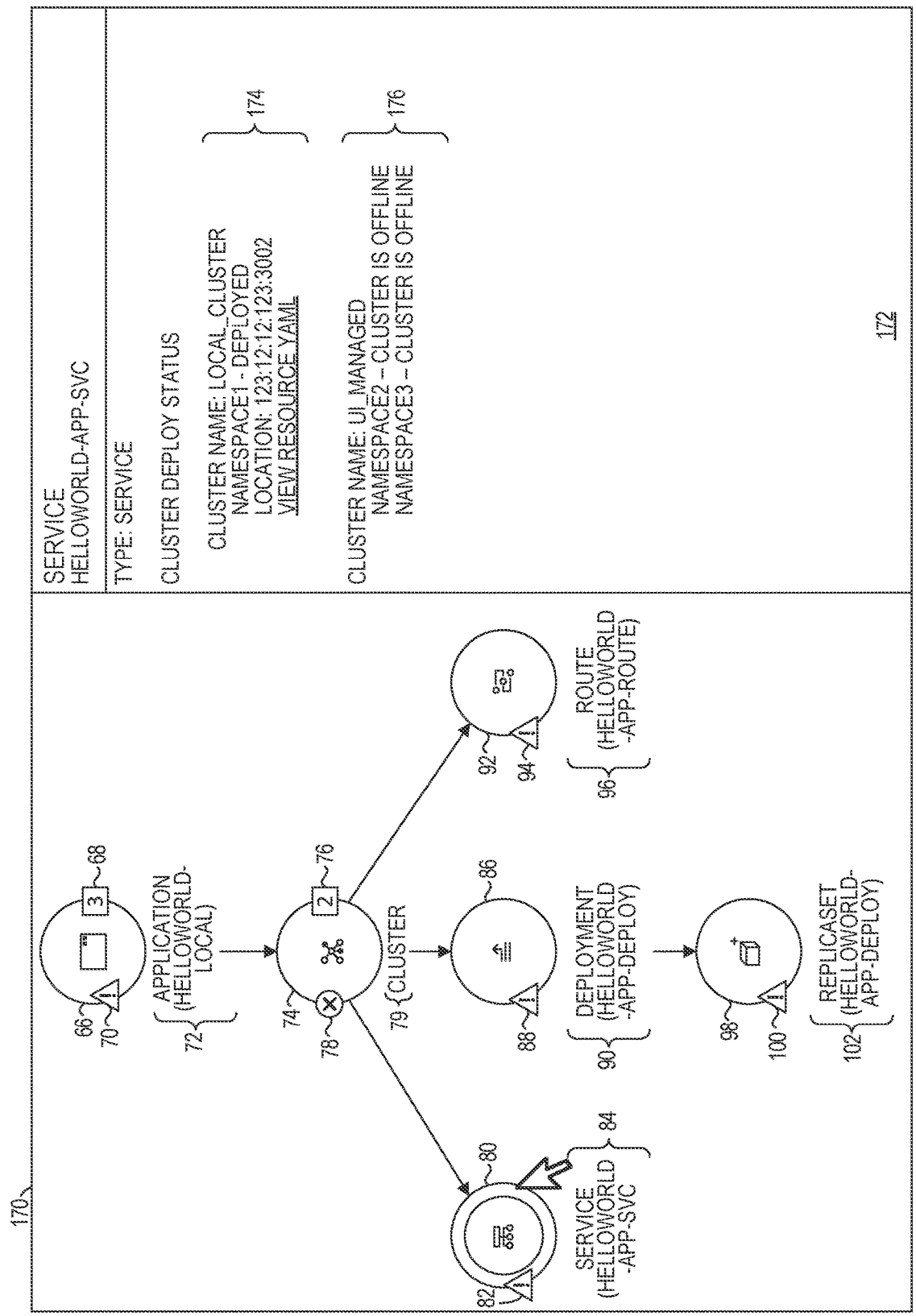

FIGS. 4A-4C illustrate various user interface imagery that may be presented on the display device 18 in accordance with one implementation. Referring first to FIG. 4A, assume for purposes of illustration that the cluster 24-P has a problem and can no longer be reached. The introspection service 20 generates user interface imagery 150. The status indicators 70, 78, 82, 88, 94, and 100 have all changed to illustrate that there are issues with the corresponding deployment applications 38, the clusters 24 and the resources 48, 50, 52, and 54. The user interface imagery 150 includes an information section 152 about the deployment applications 42-1-42-3. A section 154 indicates that there are no issues with the deployment application 42-1. A section 156 indicates that there are no issues with the deployment application 42-2. A section 158 indicates that the deployment application 42-3 is missing. This may be determined, for example, by the introspection service 20 by requesting the deployment application resource 44-3 from the cluster controller 28-P and analyzing the contents of the deployment application resource 44-3 received from the cluster controller 28-P.

Assume for purposes of illustration that the operator selects the cluster resource icon 74, such as by using a mouse or other input mechanism. Referring now to FIG. 4B, in response to the selection of the cluster resource icon 74, the introspection service 20 generates and presents user interface imagery 160 on the display device 18. The user interface imagery 160 includes an information section 162 about the clusters 24-1 and 24-P. A section 164 includes information regarding the cluster 24-1, including the name of the cluster 24-1, the name of the namespace used by the cluster 24-1, in this example, "LOCAL_CLUSTER_NAMESPACE", and the status of the cluster 24-1, in this example, "OK". A section 166 includes information regarding the cluster 24-P, including the name of the cluster 24-P, the name of the namespace used by the cluster 24-P, in this example, "UI_MANAGED_NAMESPACE", and the status of the cluster 24-P, in this example, "OFFLINE".

Assume for purposes of illustration that the operator selects the service resource icon 80, such as by using a mouse or other input mechanism. Referring now to FIG. 4C, in response to the selection of the service icon 80, the introspection service 20 generates and presents user interface imagery 170 on the display device 18. The user interface imagery 170 includes an information section 172 about the deployment status of the service resources 50-1-50-3. A section 174 indicates that the service resource 50-1 is successfully deployed on the cluster 24-1. A section 176 indicates that the service resources 50-2 and 50-3 are not deployed because the cluster 24-P is offline.

Figure 5:
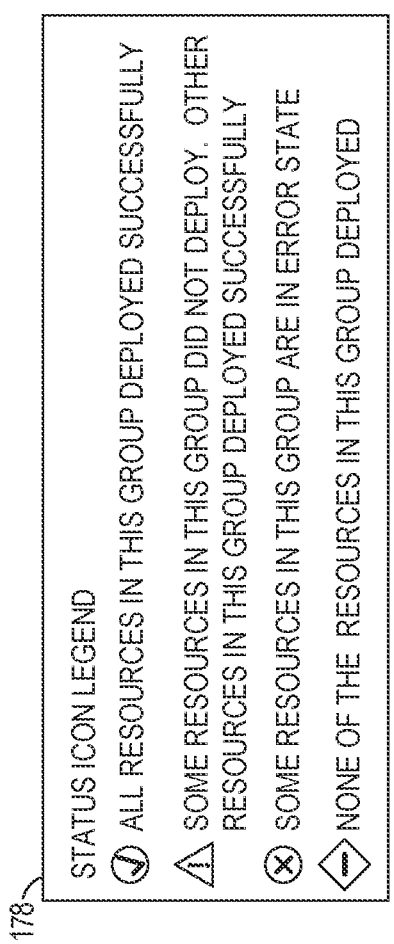
FIG. 5 illustrates a legend explaining icons that may be used in user interface imagery according to one implementation.

FIG. 5 illustrates a legend 178 that identifies status indicators that the introspection service 20 may display in user interface imagery in conjunction with an icon based on a current status of the corresponding resources.

Via the icons, an operator is able to quickly ascertain whether there is a problem with a deployment application 38, a cluster 24, or a resource of a containerized application 32-1. Note that the user interface imagery illustrated in FIGS. 3A-4C contain a single icon to represent a corresponding entity, such as the deployment applications 38, the clusters 24, and each resource 48, 50, 52, 54, irrespective of the number of deployment applications 38, the clusters 24, and the resources 48, 50, 52, 54 that have been deployed. This allows an operator to quickly identify possible problems without being presented with complex user interface imagery depicting tens or hundreds of deployment applications, tens or hundreds of clusters, and thousands of deployed resources. The operator can then select a desired icon to obtain detailed information about the entities to which the selected icon corresponds.

Figure 6:
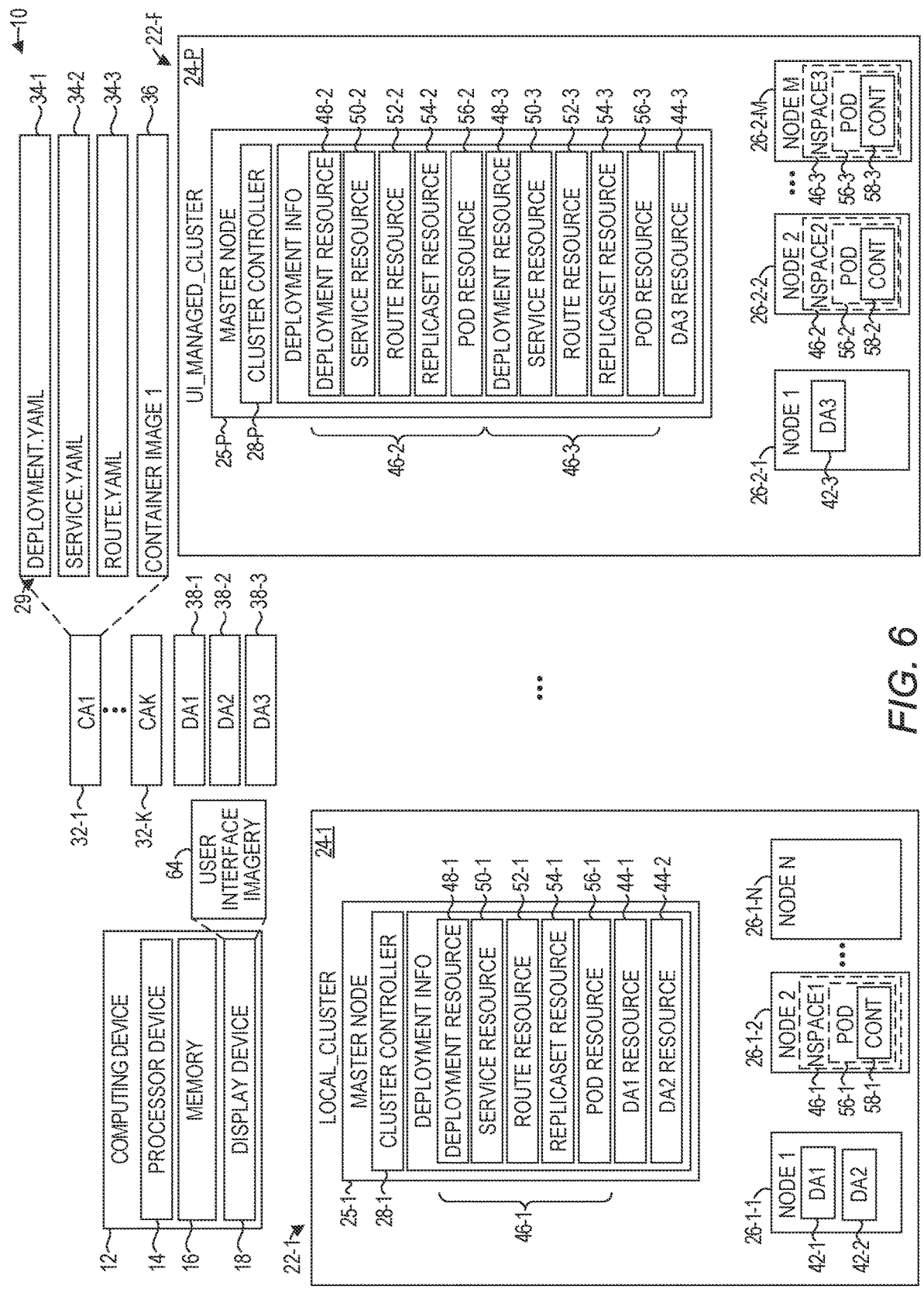
FIG. 6 is a simplified block diagram of the runtime environment illustrated in FIG. 1 according to one example.

FIG. 6 is a simplified block diagram of the runtime environment 10 illustrated in FIG. 1 according to one example. The environment 10 includes the computing device 12, which in turn includes the memory 16 and the processor device 14 coupled to the memory 16. The processor device 14 is to identify the set of deployment applications 38-1-38-3 of the plurality of deployment applications 38-1-38-J, each deployment application 38-1-38-3 in the set being configured to deploy the plurality of resources 35-1-35-3 that compose the containerized application 32-1 onto at least one cluster 24-1 of the plurality of different clusters 24-1-24-P, each cluster 24 comprising a plurality of nodes 26 onto which the plurality of resources 35-1-35-3 can be deployed. The processor device 14 is further to identify the set of clusters 24-1 and 24-P of the plurality of clusters 24-1-24-P onto which the plurality of resources 35-1-35-3 have been deployed. The processor device 14 is further to generate the user interface imagery 64 that includes information that identifies 1) the set of resources 48, 50, 52, 54 of the plurality of resources 48, 50, 52, 54, 56 of the containerized application 32-1; 2) the total number of deployment applications 38 in the set of deployment applications 38; and 3) the total number of clusters 24-1 and 24-P in the set of clusters 24-1-24-P. The processor device 14 is further to present, on the display device 18, the user interface imagery 64.

Figure 7:
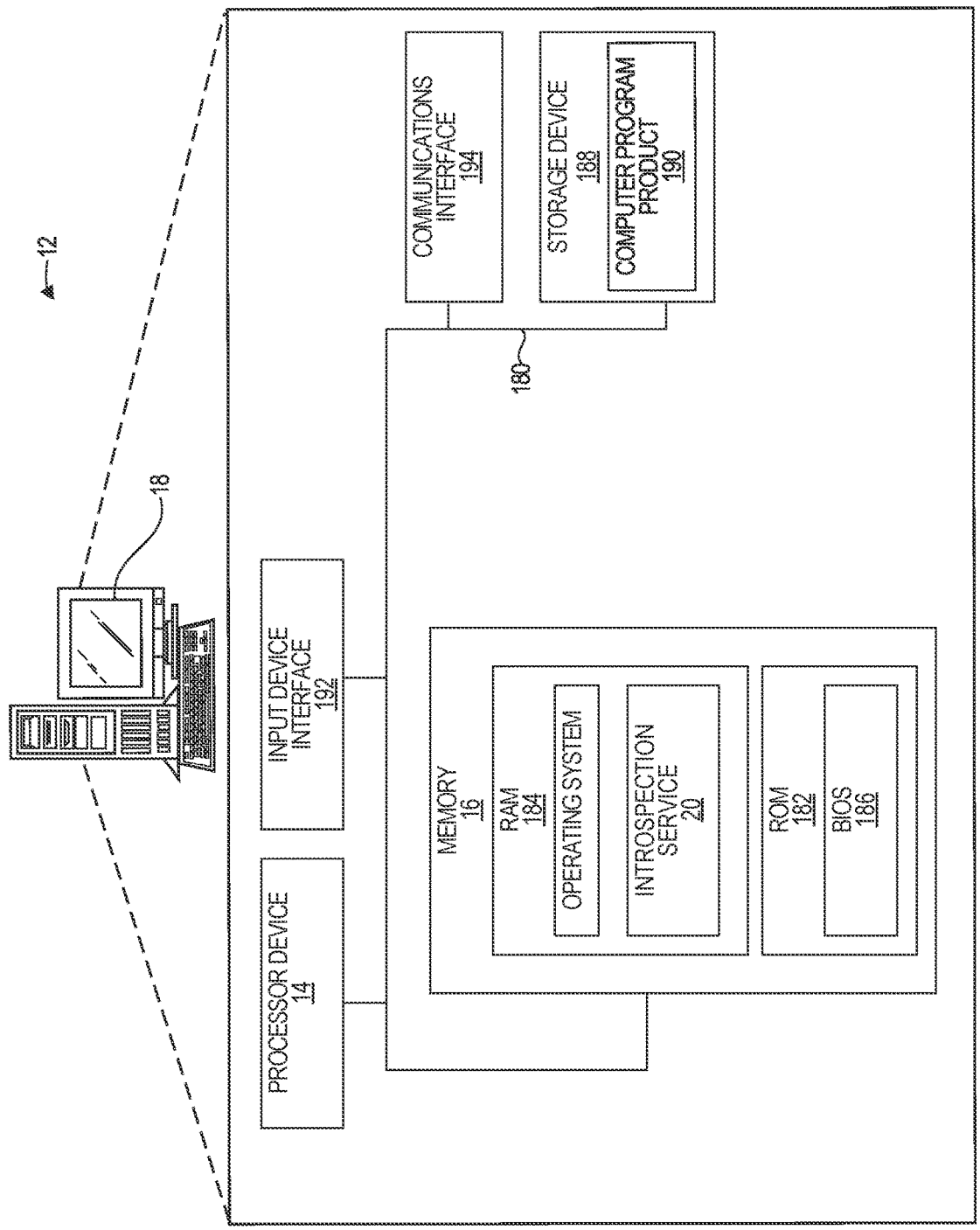
FIG. 7 is a block diagram of a computing device suitable for implementing examples according to one example.

FIG. 7 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 14, the system memory 16, and a system bus 180. The system bus 180 provides an interface for system components including, but not limited to, the system memory 16 and the processor device 14. The processor device 14 can be any commercially available or proprietary processor.

The system bus 180 may be any of several types of bus structures that may further interconnect to a memory bus (with or without a memory controller), a peripheral bus, and/or a local bus using any of a variety of commercially available bus architectures. The system memory 16 may include non-volatile memory 182 (e.g., read-only memory (ROM), erasable programmable read-only memory (EPROM), electrically erasable programmable read-only memory (EEPROM), etc.), and volatile memory 184 (e.g., random-access memory (RAM)). A basic input/output system (BIOS) 186 may be stored in the non-volatile memory 182 and can include the basic routines that help to transfer information between elements within the computing device 12. The volatile memory 184 may also include a high-speed RAM, such as static RAM, for caching data.

The computing device 12 may further include or be coupled to a non-transitory computer-readable storage medium such as a storage device 188, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 188 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 188 and in the volatile memory 184, including an operating system and one or more program modules, such as the introspection service 20, which may implement the functionality described herein in whole or in part.

All or a portion of the examples may be implemented as a computer program product 190 stored on a transitory or non-transitory computer-usable or computer-readable storage medium, such as the storage device 188, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the introspection service 20 in the volatile memory 184, may serve as a controller, or control system, for the computing device 12 that is to implement the functionality described herein.

An operator may also be able to enter one or more configuration commands through a keyboard (not illustrated), a pointing device such as a mouse (not illustrated), or a touch-sensitive surface such as the display device 18. Such input devices may be connected to the processor device 14 through an input device interface 192 that is coupled to the system bus 180 but can be connected by other interfaces such as a parallel port, an Institute of Electrical and Electronic Engineers (IEEE) 1394 serial port, a Universal Serial Bus (USB) port, an IR interface, and the like. The computing device 12 may also include a communications interface 194, such as an Ethernet transceiver, suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
retrieving, by a computing device comprising a processor device from a repository associated with a containerized application, data indicative of a plurality of resources that compose the containerized application;
generating user interface imagery that includes information that:
identifies the plurality of resources that compose the containerized application;
identifies a plurality of deployment statuses associated with the plurality of resources that compose the containerized application;
identifies a total number of deployment applications in a set of deployment applications of a plurality of deployment applications, each deployment application in the set being configured to deploy the plurality of resources that compose the containerized application onto at least one cluster of a plurality of clusters, each cluster comprising a plurality of nodes onto which the plurality of resources can be deployed; and
identifies a total number of clusters in a set of clusters of the plurality of clusters onto which one or more resources of the plurality of resources that compose the containerized application has been deployed; and
presenting, on a display device, the user interface imagery.

2. The method of claim 1 wherein each deployment application of the set of deployment applications is a different type of deployment application.

3. The method of claim 1 further comprising:
determining, for each respective deployment application of the set of deployment applications, a corresponding name; and
including, in the user interface imagery, for each respective deployment application of the set of deployment applications, information that identifies the corresponding name.

4. The method of claim 3 further comprising:
determining, for each respective deployment application of the set of deployment applications, one or more clusters of the plurality of clusters to which the respective deployment application is configured to deploy the plurality of resources that compose the containerized application; and including, in the user interface imagery, for each respective deployment application of the set of deployment applications, information that identifies the one or more clusters to which the respective deployment application is configured to deploy the plurality of resources that compose the containerized application.

5. The method of claim 3 further comprising:
determining, for each respective deployment application of the set of deployment applications, one or more namespaces in which the respective deployment application is configured to deploy the plurality of resources that compose the containerized application; and
including, in the user interface imagery, for each respective deployment application of the set of deployment applications, information that identifies the one or more namespaces in which the respective deployment application is configured to deploy the plurality of resources that compose the containerized application.

6. The method of claim 3 further comprising:
determining, for each respective deployment application of the set of deployment applications, a current status of a plurality of potential current statuses of the respective deployment application; and
including, in the user interface imagery, for each respective deployment application of the set of deployment applications, information that identifies the current status.

7. The method of claim 1 further comprising:
including in the user interface imagery:
a deployment application icon that represents the plurality of deployment applications;
a cluster icon that represents the plurality of clusters; and
for each respective resource of the plurality of resources, a resource icon that represents the respective resource.

8. The method of claim 1 wherein
each cluster in the plurality of clusters has a corresponding cluster controller, and further comprising:
accessing a list of the plurality of deployment applications;
sending, to each cluster controller, a request for application deployment information for each deployment application in the plurality of deployment applications; and
determining, based on responses from the cluster controllers, the set of deployment applications.

9. The method of claim 1 further comprising:
determining, for each respective deployment application in the set of deployment applications, a corresponding set of clusters of the plurality of clusters to which the respective deployment application is configured to deploy resources.

10. The method of claim 9 wherein determining, for each respective deployment application in the set of deployment applications, the corresponding set of clusters of the plurality of clusters to which the respective deployment application is configured to deploy resources comprises:
obtaining, for each respective deployment application in the set of deployment applications, corresponding application deployment information; and
analyzing each application deployment information to identify the corresponding set of clusters of the plurality of clusters to which the respective deployment application is configured to deploy resources.

11. The method of claim 1 further comprising:
determining, for each respective deployment application in the set of deployment applications, a corresponding set of namespaces in which the respective deployment application is configured to deploy resources.

12. The method of claim 11 wherein determining, for each respective deployment application in the set of deployment applications, the corresponding set of namespaces in which the respective deployment application is configured to deploy resources comprises:
obtaining, for each respective deployment application in the set of deployment applications, corresponding application deployment information; and
analyzing each application deployment information to identify the corresponding set of namespaces in which the respective deployment application is configured to deploy resources.

13. The method of claim 1 wherein the user interface imagery includes a cluster icon that represents the plurality of clusters, and further comprising:
receiving user input that selects the cluster icon;
in response to the user input, accessing cluster information that identifies a status of each cluster of the plurality of clusters;
generating additional user interface imagery that includes information that identifies the status of each cluster of the plurality of clusters; and
presenting, on the display device, the additional user interface imagery.

14. A computing device, comprising:
a memory; and
a processor device coupled to the memory to:
retrieve, from a repository associated with a containerized application, data indicative of a plurality of resources that compose the containerized application;
generate user interface imagery that includes information that:
identifies the plurality of resources that compose the containerized application;
identifies a plurality of deployment statuses associated with the plurality of resources that compose the containerized application;
identifies a total number of deployment applications in a set of deployment applications of a plurality of deployment applications, each deployment application in the set being configured to deploy the plurality of resources that compose the containerized application onto at least one cluster of a plurality of clusters, each cluster comprising a plurality of nodes onto which the plurality of resources can be deployed; and
identifies a total number of clusters in a set of clusters of the plurality of clusters onto which one or more resources of the plurality of resources that compose the containerized application has been deployed; and
present, on a display device, the user interface imagery.

15. The computing device of claim 14 wherein the processor device is further to:
determine, for each respective deployment application of the set of deployment applications, a corresponding name; and
include, in the user interface imagery, for each respective deployment application of the set of deployment applications, information that identifies the corresponding name.

16. The computing device of claim 15 wherein the processor device is further to:
- determine, for each respective deployment application of the set of deployment applications, one or more clusters of the plurality of clusters to which the respective deployment application is configured to deploy the plurality of resources that compose the containerized application; and
- include, in the user interface imagery, for each respective deployment application of the set of deployment applications, information that identifies the one or more clusters to which the respective deployment application is configured to deploy the plurality of resources that compose the containerized application.

17. The computing device of claim 15 wherein the processor device is further to:
- determine, for each respective deployment application of the set of deployment applications, one or more namespaces in which the respective deployment application is configured to deploy the plurality of resources that compose the containerized application; and
- include, in the user interface imagery, for each respective deployment application of the set of deployment applications, information that identifies the one or more namespaces in which the respective deployment application is configured to deploy the plurality of resources that compose the containerized application.

18. A non-transitory computer-readable storage medium that includes executable instructions to cause a processor device to:
- retrieve, from a repository associated with a containerized application, data indicative of a plurality of resources that compose the containerized application;
- generate user interface imagery that includes information that:
  - identifies the plurality of deployed resources of that compose the containerized application;
  - identifies a plurality of deployment statuses associated with the plurality of resources that compose the containerized application;
  - identifies a total number of deployment applications in a set of deployment applications of a plurality of deployment applications, each deployment application in the set being configured to deploy the plurality of resources that compose the containerized application onto at least one cluster of a plurality of clusters, each cluster comprising a plurality of nodes onto which the plurality of resources can be deployed; and
  - identifies a total number of clusters in a set of clusters of the plurality of clusters onto which one or more resources of the plurality of resources that compose the containerized application has been deployed; and
- present, on a display device, the user interface imagery.

19. The non-transitory computer-readable storage medium of claim 18 wherein the instructions further cause the processor device to:
- determine, for each respective deployment application of the set of deployment applications, a corresponding name; and
- include, in the user interface imagery, for each respective deployment application of the set of deployment applications, information that identifies the corresponding name.

20. The non-transitory computer-readable storage medium of claim 19 wherein the instructions further cause the processor device to:
- determine, for each respective deployment application of the set of deployment applications, one or more clusters of the plurality of clusters to which the respective deployment application is configured to deploy the plurality of resources that compose the containerized application; and
- include, in the user interface imagery, for each respective deployment application of the set of deployment applications, information that identifies the one or more clusters to which the respective deployment application is configured to deploy the plurality of resources that compose the containerized application.

* * * * *